(12) United States Patent
Kottilingal et al.

(10) Patent No.: US 8,910,307 B2
(45) Date of Patent: Dec. 9, 2014

(54) HARDWARE ENFORCED OUTPUT SECURITY SETTINGS

(71) Applicant: QUALCOMM Incorporated, San Diego, CA (US)

(72) Inventors: Sudeep Ravi Kottilingal, San Diego, CA (US); Gary Arthur Ciambella, Newmarket (CA); Steven John Halter, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/715,351

(22) Filed: Dec. 14, 2012

(65) Prior Publication Data

US 2013/0305342 A1 Nov. 14, 2013

Related U.S. Application Data

(60) Provisional application No. 61/645,577, filed on May 10, 2012.

(51) Int. Cl.

| | |
|---|---|
| *G06F 9/06* | (2006.01) |
| *H04N 21/4385* | (2011.01) |
| *H04N 21/426* | (2011.01) |
| *H04N 21/443* | (2011.01) |
| *H04N 21/835* | (2011.01) |
| *H04N 21/4405* | (2011.01) |
| *G06F 21/62* | (2013.01) |
| *H04N 21/44* | (2011.01) |
| *H04L 29/06* | (2006.01) |

(52) U.S. Cl.
CPC .......... *G06F 21/62* (2013.01); *H04N 21/43853* (2013.01); *H04N 21/42623* (2013.01); *H04N 21/42653* (2013.01); *H04N 21/4431* (2013.01); *H04N 21/835* (2013.01); *H04N 21/4405* (2013.01); *H04N 21/42692* (2013.01); *H04N 21/4435* (2013.01); *H04N 21/44004* (2013.01); *H04L 63/02* (2013.01)
USPC .............................. 726/29; 726/11; 713/165

(58) Field of Classification Search
USPC .......... 726/11, 29, 26, 32; 713/193, 165, 167, 713/189
See application file for complete search history.

(56) References Cited

U.S. PATENT DOCUMENTS

| | | | |
|---|---|---|---|
| 7,366,917 B2 | 4/2008 | Shih | |
| 7,734,926 B2 | 6/2010 | Morais | |

(Continued)

FOREIGN PATENT DOCUMENTS

| | | |
|---|---|---|
| EP | 1355218 A2 | 10/2003 |
| EP | 1370084 A1 | 12/2003 |

(Continued)

OTHER PUBLICATIONS

U.S. Appl. No. 13/842,839, by Sudeep Ravi Kottilingal, filed Mar. 15, 2013.

(Continued)

*Primary Examiner* — Amare F Tabor
(74) *Attorney, Agent, or Firm* — Shumaker & Sieffert, P.A.

(57) ABSTRACT

Generally, aspects of this disclosure are directed to copy protection techniques. Areas in memory may be secured to establish a secure memory area in the memory that is not accessible by unauthorized clients. A request to decode video content stored in the secure memory area may be received. If the video content to be decoded is stored in the secure memory area, a first MMU associated with the hardware decoder may enforce a rule that the video content is to be decoded into one or more output buffers in the secure memory area. A request to display the decoded video content stored in the secure memory area may be received. If the decoded video content is stored in the secure memory area, a second MMU associated with a hardware display processor may enforce a rule that a secure link be established between the hardware display processor and an output device.

27 Claims, 21 Drawing Sheets

(56) References Cited

U.S. PATENT DOCUMENTS

| | | | |
|---|---|---|---|
| 7,907,823 | B2 | 3/2011 | Jureczki |
| 7,949,835 | B2 | 5/2011 | Kershaw et al. |
| 7,962,746 | B2 | 6/2011 | Haga et al. |
| 8,135,964 | B2 | 3/2012 | Shi et al. |
| 8,156,565 | B2 | 4/2012 | MacDonald et al. |
| 8,453,206 | B2 * | 5/2013 | Haga et al. ............ 726/2 |
| 8,478,959 | B1 | 7/2013 | Wyatt |
| 8,499,151 | B2 * | 7/2013 | Durham et al. ......... 713/164 |
| 2007/0118880 | A1 | 5/2007 | Mauro et al. |
| 2007/0300078 | A1 | 12/2007 | Ochi et al. |
| 2008/0126762 | A1 | 5/2008 | Kelley et al. |
| 2008/0282093 | A1 | 11/2008 | Hatakeyama |
| 2009/0313695 | A1 | 12/2009 | Bridges et al. |
| 2011/0078760 | A1 | 3/2011 | De Perthuis |
| 2011/0289294 | A1 | 11/2011 | Maeda et al. |

FOREIGN PATENT DOCUMENTS

| | | |
|---|---|---|
| EP | 1376302 A2 | 1/2004 |
| EP | 2363822 A2 | 9/2011 |
| WO | 2004046916 A2 | 6/2004 |

OTHER PUBLICATIONS

ARM: "CoreLink (TM) MMA-400 System Memory Management Unit Revision: r0p0 Technical Reference Manual", Oct. 7, 2011, XP055076477, 101 pp.

ARM Limited: "ARM Security Technology—Building a Secure System using Trust Zone Technology", Internet Citation, Apr. 30, 2009, pp. I-XII, XP002660015, 108 pp.

International Search Report and Written Opinion—PCT/US2013/036802—ISA/EPO—Sep. 4, 2013, 14 pp.

Response to Written Opinion dated Sep. 4, 2013, from International patent application No. PCT/US2013/036802, filed Mar. 7, 2014, 11 pp.

Second Written Opinion from corresponding PCT Application Serial No. PCT/US2013/036802, dated Jun. 2, 2014, 6 pp.

* cited by examiner

HARDWARE ENFORCED OUTPUT SECURITY SETTINGS

This application claims the benefit of U.S. Provisional Application No. 61/645,577, filed May 10, 2012, the entire content of which is hereby incorporated by reference.

TECHNICAL FIELD

This disclosure relates to content processing and more particularly relates to processing of copy protected content.

BACKGROUND

Copy protection solutions may be used to restrict access rights to copy protected content. For example, copy protection solutions may limit the unauthorized playback or copying of copy protected content. Rogue users may wish to bypass copy protection solutions so that they may easily copy and playback copy protected content

SUMMARY

In general, this disclosure describes techniques for enforcing copy protection and preventing unauthorized access of copy protected content using hardware. Current software copy protection solutions may be easily bypassed in open-source operating systems such as the Android® operating system. A hardware-based copy protection solution may be harder to bypass even if it is used in conjunction with open-source operating systems. The techniques described herein may include end-to-end content protection techniques that address attacks while media such as video is traveling inside the computing device. The techniques may also include enforcing usage rules and regulating interaction between inputs and outputs to assure all usage rules are met. The techniques may also include enforcing robustness rules and compliance rules of the various content protection mechanisms.

In one example, a method includes securing, by a hardware firewall of a computing device, areas in a memory in the computing device to establish a secure memory area in the memory that is not accessible by unauthorized clients by enforcing read and write rules for the secure memory area. The method further includes receiving a request to decode video content stored in the secure memory area. The method further includes, if the video content to be decoded is stored in the secure memory area, enforcing a rule by a first memory management unit (MMU) associated with a hardware video decoder of the computing device that the video content is to be decoded into one or more output buffers in the secure memory area, including decoding, by the hardware video decoder, the video content into the one or more output buffers in the secure memory area. The method further includes receiving a request to display the decoded video content stored in the secure memory area. The method further includes, if the decoded video content is stored in the secure memory area, enforcing a rule by a second MMU associated with a hardware display processor that a secure link be established between the hardware display processor and an output device, including rendering, by the hardware display processor in the computing device, the decoded video content at the output device via the secure link.

In another example, a content protection apparatus includes memory partitioned into a non-secure memory area and a secure memory area. The apparatus further includes a hardware firewall configured to prevent unauthorized access to the secure memory area by enforcing read and write rules for the secure memory area. The apparatus further includes a hardware video decoder configured to receive a request to decode video content stored in the secure memory area and to decode the video content into one or more output buffers in the secure memory area. The apparatus further includes a first memory management unit (MMU) associated with the hardware video decoder, wherein the first MMU is configured to enforce a rule that the video content is to be decoded into the one more output buffers in the secure memory area. The apparatus further includes a hardware display processor configured to receive a request to render the decoded video content and to render the decoded video content at an output device via a secure link. The apparatus further includes a second MMU associated with the hardware display processor, wherein the second MMU is configured to enforce a rule that a secure link be established between the hardware display processor and the output device.

In another example, an apparatus includes means for securing areas in a memory in a computing device to establish a secure memory area in the memory that is not accessible by unauthorized clients by enforcing read and write rules for the secure memory area. The apparatus further includes means for receiving a request to decode video content stored in the secure memory area. The apparatus further includes, if the video content to be decoded is stored in the secure memory area, means for enforcing a rule that the video content is to be decoded into one or more output buffers in the secure memory area, including means for decoding the video content into the one or more output buffers in the secure memory area. The apparatus further includes means for receiving a request to display the decoded video content stored in the secure memory area. The apparatus further includes, if the decoded video content is stored in the secure memory area, means for enforcing a rule that a secure link be established to an output device, including means for rendering the decoded video content at the output device via the secure link.

The details of one or more examples are set forth in the accompanying drawings and the description below. Other features, objects, and advantages will be apparent from the description and drawings, and from the claims.

DETAILED DESCRIPTION

Figure 1A:
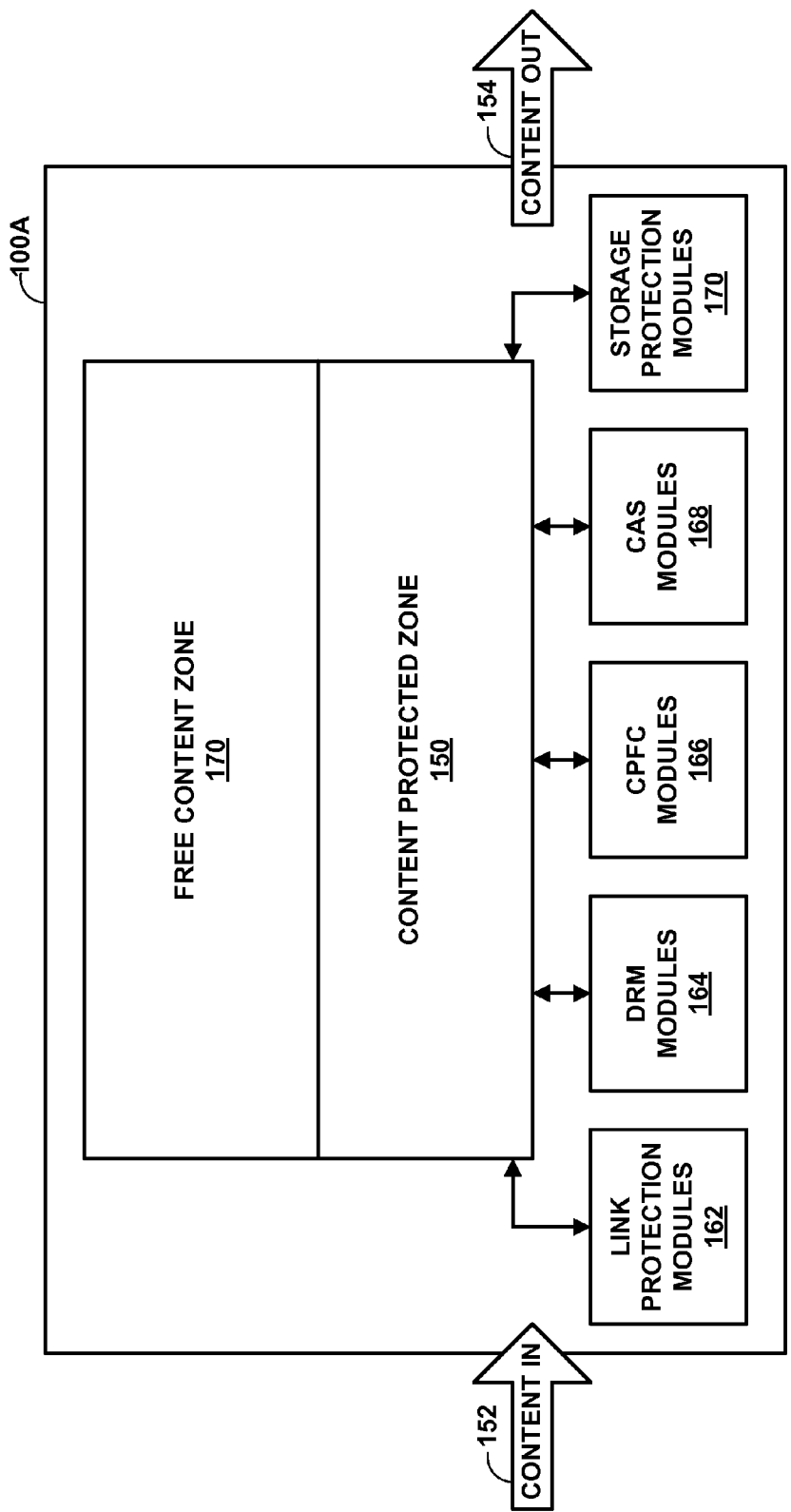
FIG. 1A is a block diagram illustrating a computing system configured to receive, process, and output the content according to aspects of the disclosure.

FIG. 1A is a block diagram illustrating a computing system configured to receive, process, and output the content according to aspects of the disclosure. As shown in FIG. 1A, computing device 100A may receive content, such as video input 152, may process the received content, and may output the processed content, such as video output 154. Computing device 100A may receive protected content as well as unprotected content. Protected content, in some examples, may be content that is accessible only to authorized users and/or components of computing device 100 and therefore should be protected from access by unauthorized users and/or components of computing device 100A.

Computing device 100A may process protected content in content protected zone 150 and may process unprotected content in free content zone 170, including processing protected and unprotected content in parallel. Content protected zone 150 may include protected buffers that provide memory isolation for protected content. Content zone 150 may protect the content from access by unauthorized users and/or components of computing device 100A, so that only authorized components may be allowed to access the protected content. In contrast, free content zone 170 may include components of computing device 100A that do not provide such memory isolation and protection. Content protected zone 150 and free content zone 170 may process content in parallel, so that content protected zone 150 may process protected content and isolate the protected content from components of computing device 100A that are not part of content protected zone 150 as free content zone 170 processes unprotected content.

Content protected zone 150 may enforce security requirements to protect the protected content. For the protection of compressed bitstreams, content protected zone 150 may enforce a requirement that any attempt to decrypt encrypted protected content is allowed only if the memory location for outputting the decrypted protected content is only accessible by a secured component of computing device 100A (e.g., a secure bus master of a bus). Content protected zone 150 may also enforce a requirement that components of computing device 100A that processes the decrypted protected content have mechanisms to prevent writing content outside of content protected zone 150. Content protected zone 150 may also enforce a requirement that the same access control scheme for the TrustZone system be used on the compressed bitstream which are decrypted from any DRM source. For the protection of uncompressed bitstreams, content protection zone 150 may enforce a requirement that any transformation which involves secure content will result in secure output. Content protection zone 150 may also impose additional requirements on output devices, such as enforcing HDCP if the content is output into an HDMI link.

Content protected zone 150 may be communicatively coupled with content protection modules such as link protection modules 162, digital rights management (DRM) modules 164, content protection central function (CPCF) modules 166, conditional access system (CAS) modules 168, storage protection modules 170, and the like. Link protection modules 162 may be configured to protect content delivery in a point to point connection where the transmitter authenticates the receiver, and may be configured to protect protected content as it enters and exits content protected zone 150. Examples of link protection modules 162 may include High-bandwidth Digital Content Protection (HDCP) and Digital Transmission Content Protection over Internet Protocol (DTCP-IP). DRM module 164 may be configured to enable cloud management of protected content, so that clients may be required to authenticate themselves in the cloud to receive keys for accessing the protected content. CPFC modules 166 may include software that governs the entry and exit interfaces and may enforce rules for determining which components are granted access to the protected content. CAS modules 168 may be a mechanism for broadcast TV to protect its service. Examples of CAS modules 168 may include Multi2 for ISDB-T, DVB-CI+ for DVB, and other proprietary CAS systems for cable satellite, and IPTV.

Content protected zone 150 may impose requirements on input into and output from content protected zone 150. Requirements for input into content protected zone 150 may include requiring any application that use content protected zone 150 copy its content into content protected zone 150, requiring that decryption be performed in a cryptographic module using a supported decryption protocol, requiring that control over the address of the decrypted buffer (i.e., output buffer for the cryptographic module) be governed by TrustZone or hardware constraints to enforce content protected zone 150 address range, and requiring that video capture that capture HDMI input shall limit content delivery to content protected zone 150's memory area if HDCP was active. Requirements for output from content protected zone 150 may include requiring that content from content protected zone 150 is only available to select hardware (e.g., codecs and display hardware) and select software (e.g., cryptographic module and TrustZone), and requiring that protected content be delivered outside of content protected zone 150 through the cryptographic module.

Figure 1B:
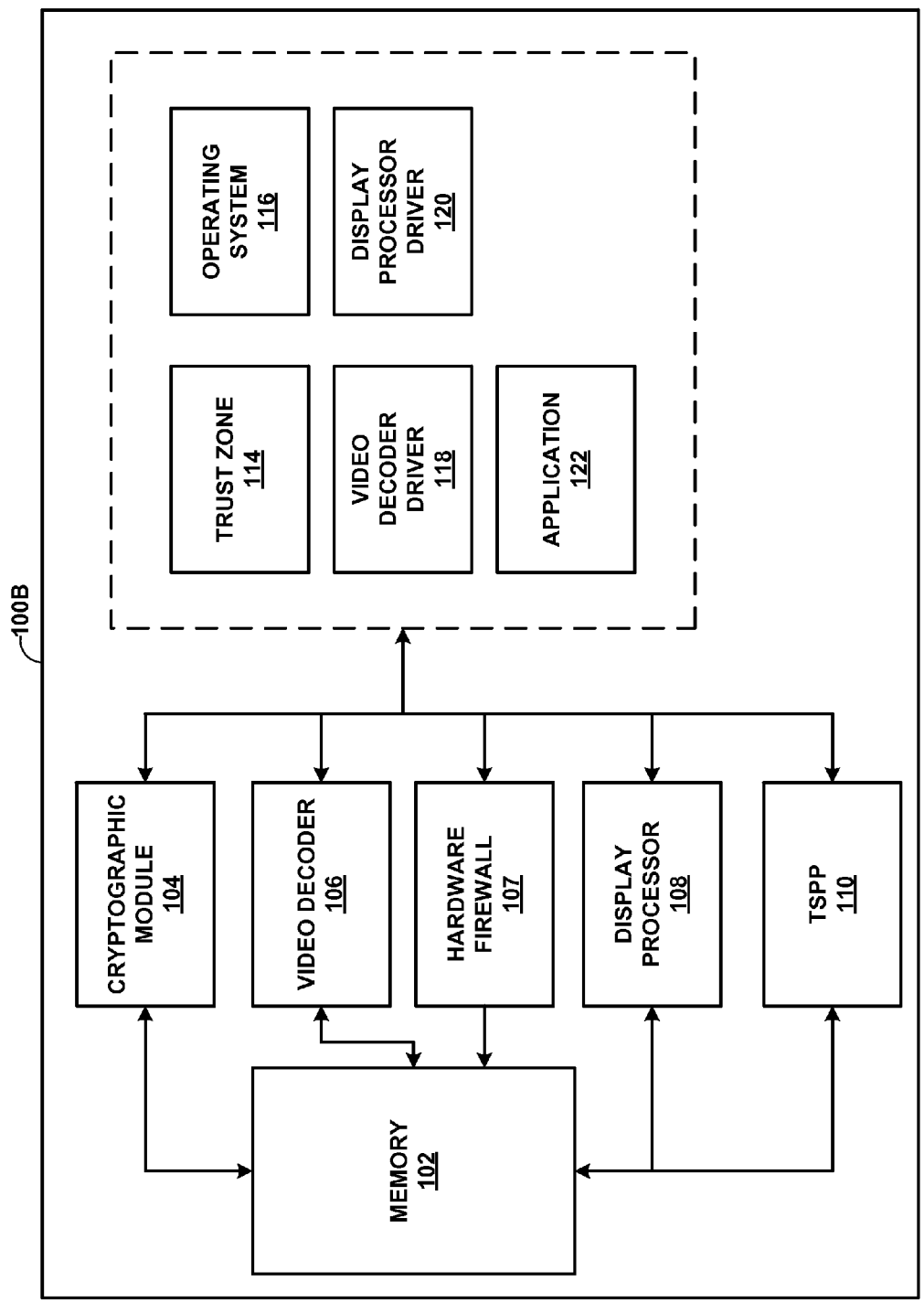
FIG. 1B is a block diagram illustrating a computing system configured to output copy protected content according to aspects of the disclosure.

FIG. 1B is a block diagram illustrating a computing system configured to output copy protected content, such as copy protected media (e.g., audio, images, and videos) according to aspects of the disclosure. As shown in FIG. 1B, computing device 100B may include memory 102, cryptographic module 104, video decoder 106, hardware firewall 107, display processor 108, Transport Stream Packet Processor (TSPP) 110, TrustZone 114, operation system 116, video decoder driver 118, display processor driver 120, and application 122. In some examples, computing device may be comprised of one or more integrated circuits, such as a system on a chip, one or more microprocessors, one or more microprocessor cores, and the like. In some examples, computing device 100B may be similar to computing device 100A shown in FIG. 1A, and, in some examples, the components of computing device 100B (e.g., one or more of memory 102, cryptographic module 104, video decoder 106, hardware firewall 107, display processor 108, TSPP 110, TrustZone 114, operating system 116, video decoder driver 118, display processor 120, and/or application 122) may be used to secure protected content within content protected zone 150 shown in FIG. 1A.

Copy protected content may be stored in memory 102. Application 122 may send a request to cryptographic module 104 to decrypt copy protected content. TrustZone 114 and hardware firewall 107 may ensure that output of cryptographic module 104 is only readable by secure hardware components such as video decoder 106 and display processor 108, and cryptographic module 104 may decrypt copy protected content into a copy protected area of memory 102. In some examples, TrustZone 114 may include CPFC modules 166. TSPP 110 may enforce content protection rules to ensure that every transport stream packet processed by TSPP 110 follows a set of copy protection rules. Video decoder 106 may read the decrypted content from the copy protected area of memory 102, decode the decrypted content, and store the decoded content in the copy protected area of memory 102. Display processor 108 may access the decoded content in the copy protected area of memory 102 and may render the content onto a display.

Operating system 116 may be a high level operating system (HLOS), such as Android®, iOS®, Linux®, Unix®, Windows®, and the like. Display processor driver 120 may be software that enables other software to communicate with display processor 108. Video decoder driver 118 may be software that enables other software to communicate with video decoder 106. TrustZone 114 may be a combination of software and/or hardware. TrustZone 114, in some examples, may include a secure kernel that executes concurrently with operating system 116 on the same processor core and includes drivers for the operating system 116 to communicate with the secure kernel. TrustZone 114 may use security extensions to protect itself from code running in operating system 116, so that even attackers that have managed to obtain full supervisor privileges in operating system 116 cannot gain access to TrustZone 114.

Figure 2B:
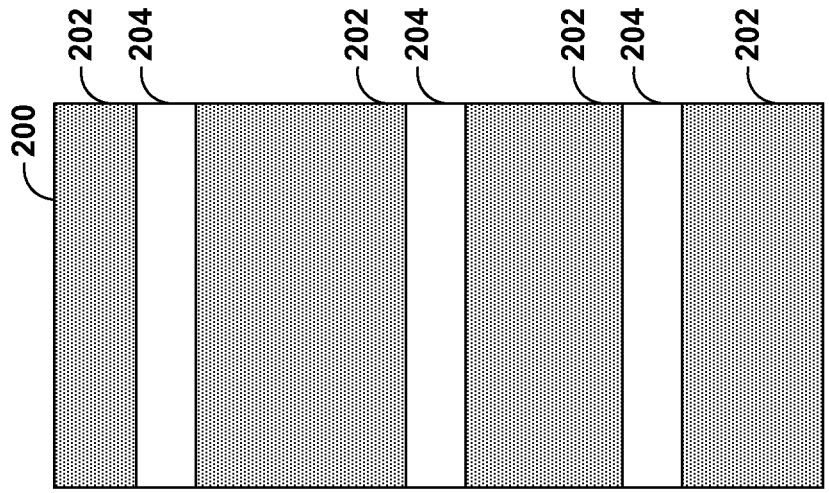
FIGS. 2A and 2B are block diagrams illustrating dividing memory into copy protected areas and non-copy protected areas according aspects of the disclosure.
Figure 2A:
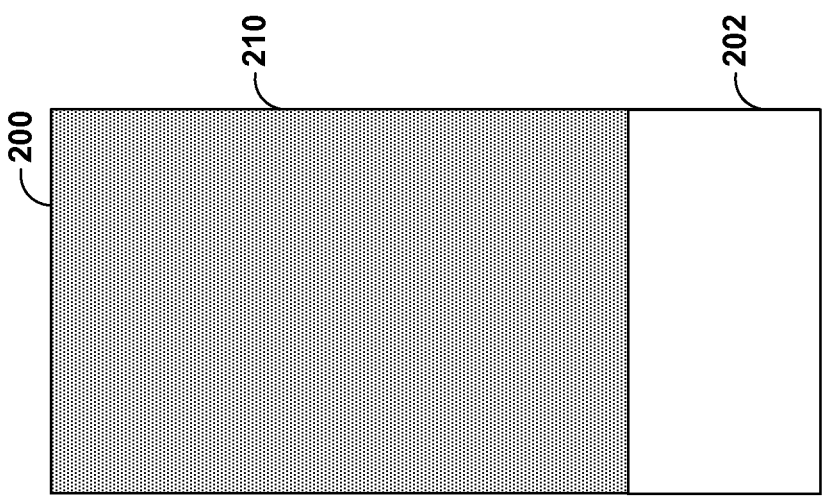

Memory 102 may be divided into secure areas and non-secure areas by securing areas of memory 102 that may only be accessible to trusted hardware and/or software to access copy protected content stored in the secured areas of memory 102. FIGS. 2A and 2B are block diagrams illustrating dividing memory 200, which may be similar to memory 102 shown in FIG. 1B, into secure and non-secure areas according aspects of the disclosure. As shown in FIG. 2A, selective parts of memory 200 may be secured by TrustZone 114 and operating system 116 so that memory 200 may be divided into non-secure memory area 210 and secure memory area 202, so that only certain trusted hardware and/or software are allowed access to copy protected content stored in secure memory area 202. Secure memory area 202 may be a large contiguous area of memory 200, such as a fifty megabyte area of memory 200 that may be divided into four kilobyte pages. Securing secure memory area 202 may include setting and enforcing, by hardware firewall 107, access control rules on secure memory area 202, so that unauthorized clients are unable to access secure memory areas 202. In general, trusted components of computing devices including memory 200, such as computing device 100A shown in FIG. 1A or computing device 100B shown in FIG. 1B may enforce the rule that if the input buffer for the component is in a secure memory area, then the output buffer for that component must also be in a secure memory area.

As shown in FIG. 2B, instead of reserving a large contiguous area of memory for storing copy protected content, smaller areas of memory 200 may be dynamically allocated and secured by TrustZone 114 and operating system 116 as secure memory areas 204 for storing copy protected content. For example, secure memory areas 204 may be 1 megabyte areas of memory 200 that may be 1 megabyte and 4 kilobyte paged. Additional secure memory areas 204 may be allocated as needed, and secure memory areas 204 may also be de-allocated and returned to memory 102 for use as non-secure memory areas 200 when no longer needed. Hardware firewall 107 may control access to secure memory areas 204, so that unauthorized clients are unable to access secure memory areas 204.

Figure 2C:
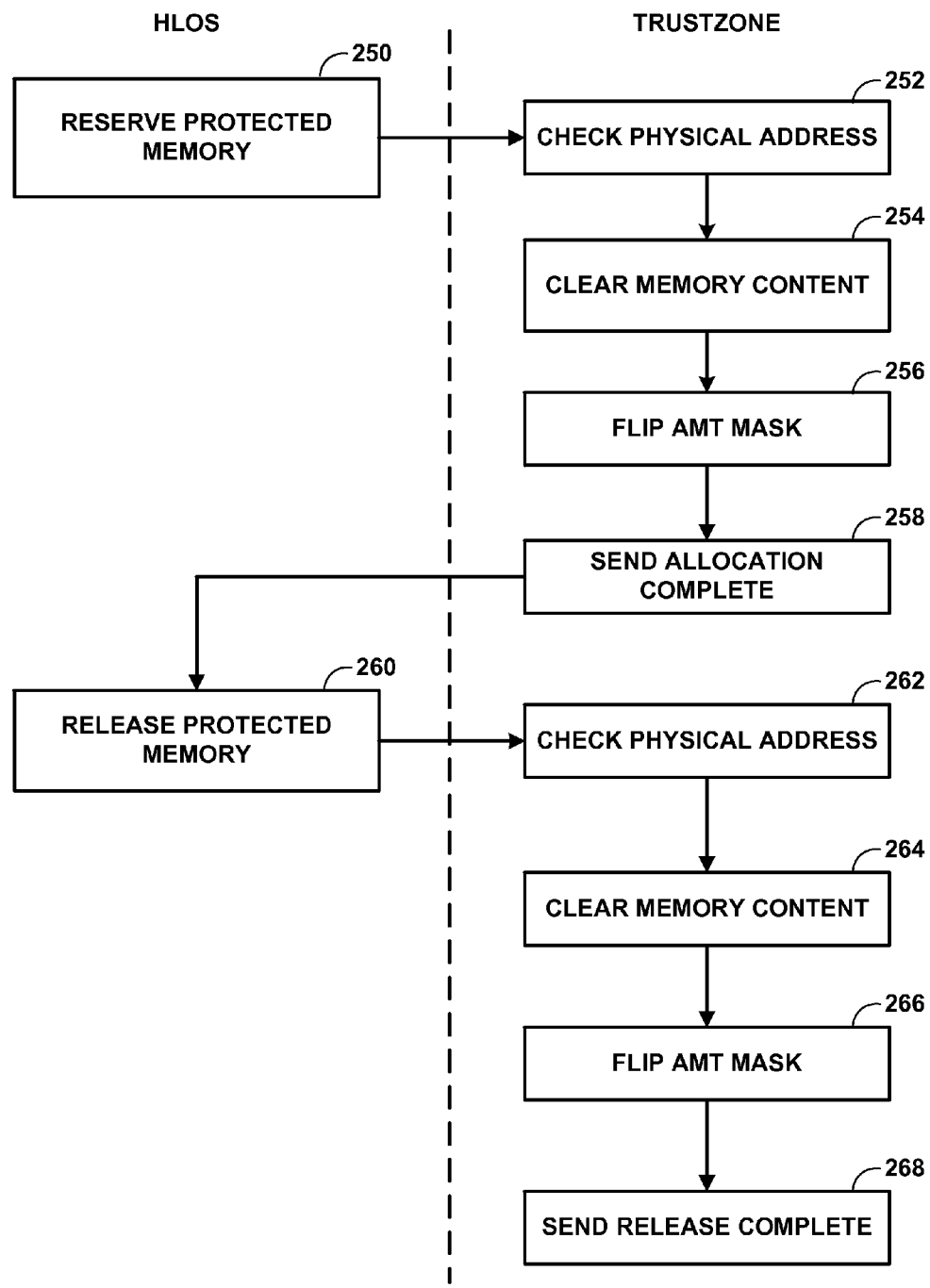
FIG. 2C is a flowchart illustrating initialization and usage of memory according to aspects of the disclosure.

FIG. 2C is a flowchart illustrating a process of on demand initialization and usage of secure memory areas of memory, such as shown in FIG. 2B, according to aspects of the disclosure. As shown in FIG. 2C, secure memory areas may be allocated in smaller chunks, such as one megabyte chunks. If secure memory areas are allocated in one megabyte chunks of memory, memory 200 may be initialized on a cold boot, and an access management table (AMT) that tracks the secure and non-secure memory areas of memory 200 may be cleared. In some examples, the AMT may be hardware that allows the one megabyte chunks of memory to be access protected. On a warm boot, TrustZone 114 may clear the memory contents of memory areas that are flagged as a secure memory area in the AMT. The high level operating system (HLOS) such as operating system 116 shown in FIG. 1B may reserve a chunk of memory as a secure area (250). Upon allocation of each secure memory area of memory, if secure memory areas are allocated in one megabyte chunks of memory, for example, a list of one megabyte contiguous chunks may be allocated from HLOS (high level operating system, such as operating system 116) kernel. Once the memory is allocated, the pointers to the secure memory area may be passed to TrustZone 114. TrustZone 114 may check the one megabyte alignment for the pointer and that the memory is mapped within memory 102 (252), may clear the memory content of the secure memory area (254), and may flip a corresponding flag in the AMT to true for the location corresponding to the one megabyte chunk of memory in question (256). TrustZone 114 may send to the HLOS an indication that the allocation of the secure memory area is complete (258). Once the copy protection use case for the secure memory area is over, the HLOS may send a request to TrustZone 114 to release the secure memory area, so that the memory may be deallocated from the secure memory areas and may be repopulated inside the HLOS kernel. TrustZone 114 may check the one megabyte alignment pointer (262), clear the contents of the secure memory areas (264), and may flip the corresponding flag in AMT to false for the location corresponding to the one megabyte chuck of memory in question (266). TrustZone 114 may send to the HLOS an indication that that the secure memory area has been released for general memory usage (268).

Figure 2D:
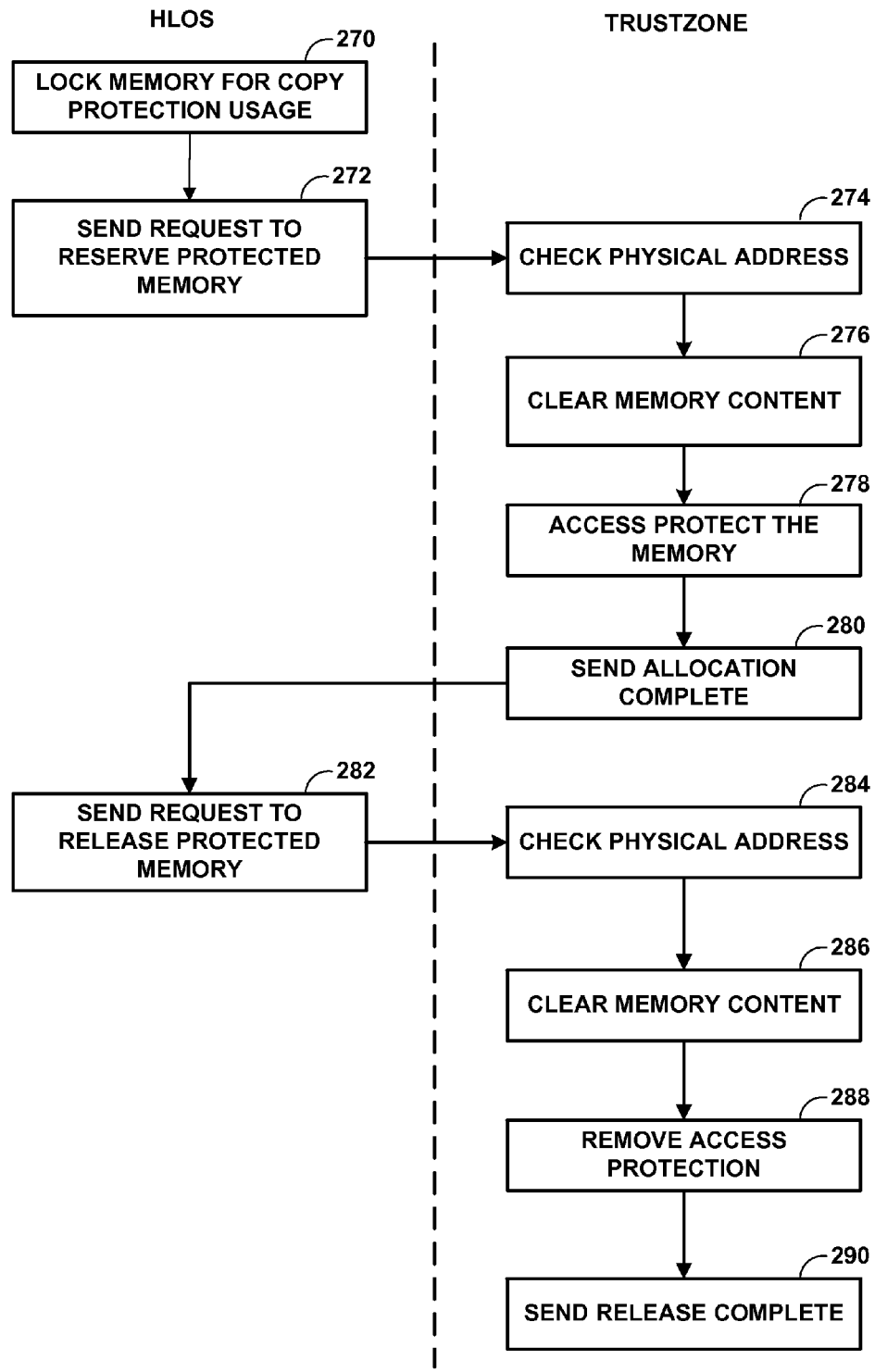
FIG. 2D is a flowchart illustrating initialization and usage of memory according to aspects of the disclosure.

FIG. 2D is a block diagram illustrating initialization and usage of pre-carved out memory 102, such as shown in FIG. 2A, according to aspects of the disclosure. As shown in FIG. 2D, a secure driver in HLOS kernel or the HLOS boot process may make an explicit request to lock a piece of memory for copy protection usage (270). HLOS may send a trap to Trust- Zone 114 to request a reservation of memory within the locked piece of memory for copy protection (272). TrustZone 114 may check the range of physical address of the reserved memory (274). TrustZone 114 may also clear the existing contents of the reserved memory (276). TrustZone 114 may further add access protection via hardware firewall 107 so that only secure clients (e.g., clients with an appropriate CP_VMID, HV VMID, or APROT_NS=0) can access the reserved memory (278). To release the memory, TrustZone 114 may clear the contents of the reserved memory and may release the access protection provided by hardware firewall 107. TrustZone 114 may send to the HLOS an indication that the reserved memory has been allocated (280). After the reserved memory is no longer being used, the HLOS may send a request to TrustZone 114 to release the reserved memory (282). Responsive to receiving the request to release the reserved memory, TrustZone 114 may check the range of physical address for the reserved memory (284), clear the memory contents of the reserved memory (286), and may remove access protection from the reserved memory, such as by adjusting hardware firewall 107's rules to have the reserved memory programmed as being accessible by HLOS VMID (288). TrustZone 114 may send an indication to the HLOS that the release of reserved memory is complete (290).

Figure 3A:
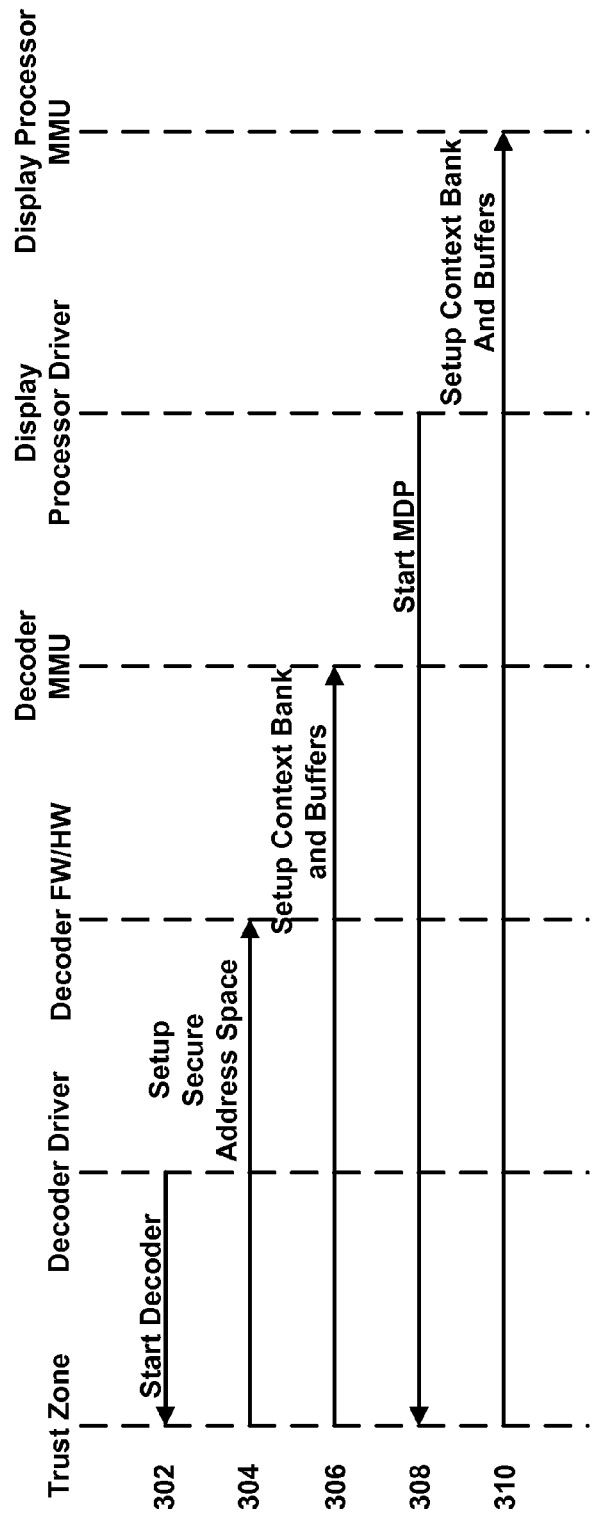
FIG. 3A is a flow diagram illustrating initialization of decoder and display processor for copy protection.

FIG. 3A is a flow diagram illustrating initialization of decoder 106 and display processor 108 for copy protection. As shown in FIG. 3, video decoder driver 118, which may be running in HLOS (e.g., operating system 116), may request initialization of video decoder 106 when started up for the first time by sending a trap to TrustZone 114 to initialize video decoder 106 (302). TrustZone 114 may respond to the trap by initializing and access protecting the security block of video decoder 106, including setting up the secure address space (304). Associated memory management (MMU) configuration for video decoder 106 may also be performed. MMU of video decoder 106 may be initialized with copy protection firmware page table, the context bank and buffers may be set up, and video decoder firmware may be authenticated and loaded (306). Video decoder 106 may be ready after a reset. Display processor driver 120 may send a request to TrustZone 114 to start display processor 108 (308). TrustZone 114 may setup display processor's context bank with page tables and buffers, display processor 108 may be started, and security may be enabled for display processor 108 (310).

Figure 3B:
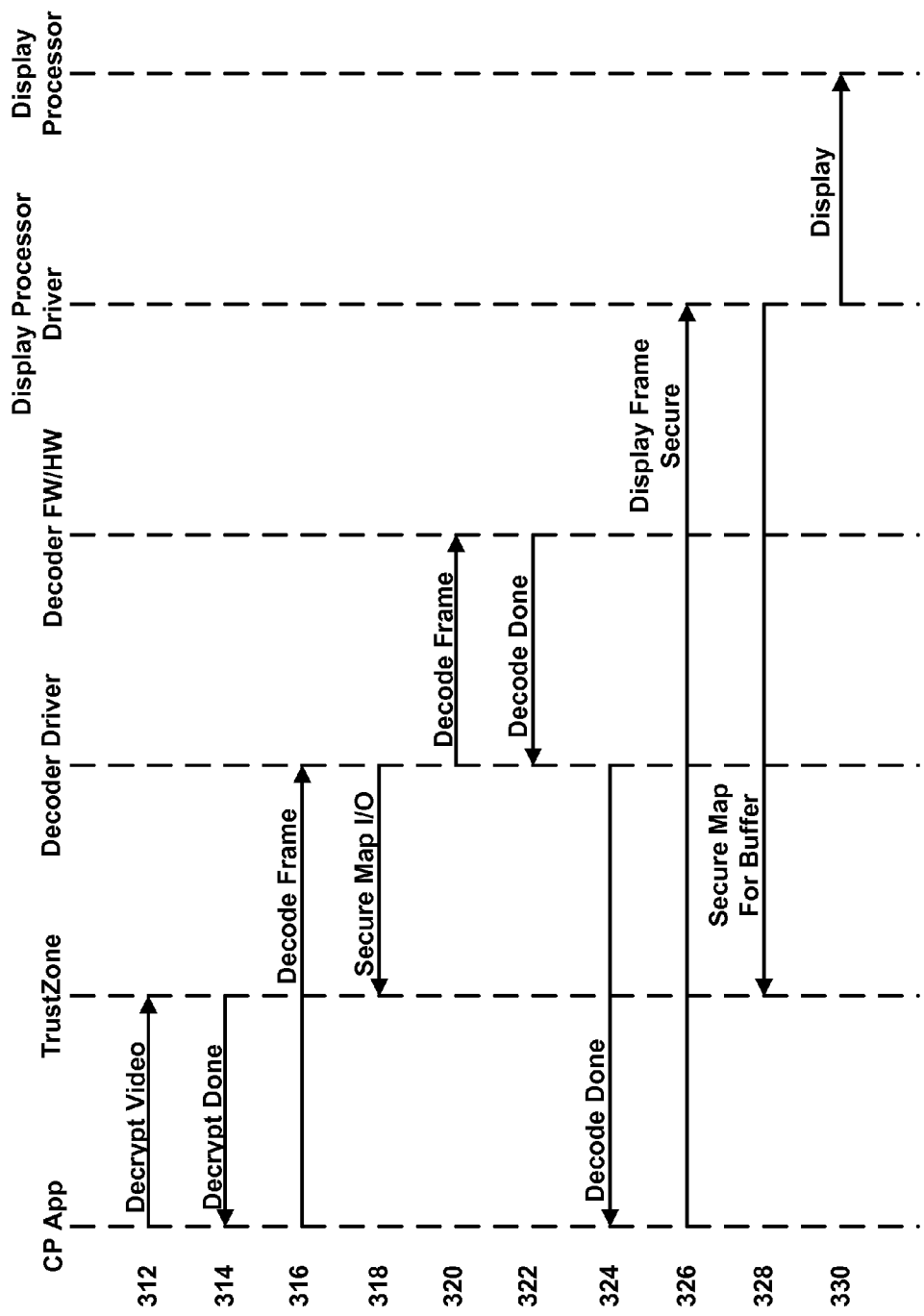
FIG. 3B is a flow diagram illustrating invocation of copy protected playback with content protection.

FIG. 3B is a flow diagram illustrating invocation of copy protected playback with content protection. As shown in FIG. 3B, a copy protected application, such as application 122 shown in FIG. 1B, may send a request to TrustZone 114 to decrypt copy protected content, such as a copy protected video (312). In response, TrustZone 114 may determine if the output buffer for the decrypted content is protected by hardware firewall 107 and may enable cryptographic module 104 to decrypt the copy protected content. Cryptographic module 104 may decrypt the copy protected content and output the decrypted content in the output buffer in the secured area of memory (memory protected by hardware firewall 107 from unauthorized access from unauthorized clients).

TrustZone 114 may report back to application 122 that the decryption has finished (314). In response, application 122 may send a request to video decoder driver 118 for video decoder 106 to decode the decrypted content stored in the secure memory area of memory 102 (316). Video decoder 106 may decode the header of the content, estimate the size of the output buffer needed to contain the decoded content, and may map via video decoder driver 118 that amount of estimated output buffer to the secure memory areas of memory 102 (318).

Once the output buffer for video decoder 106 has been successfully mapped into memory 102, video decoder driver 118 may enable video decoder 106 to decode frames of the content and to output the decoded content into the output buffer in secure memory areas of memory 102 (320).

Video decoder driver 118 may be notified when the video decoder 106 finishes decoding a frame of content (322). In turn, video decoder driver 118 may notify application 122 that the video decoder 106 has finished decoding a frame of content (324). Application 122 may notify display processor driver 120 that the decoded content is ready for display processor 108 to render onto a display (326). Display processor driver 120 may map underlying pages of the secure memory areas of memory 102 into display processor 108's context bank dedicated for copy protected content (328). Display processor 108 may render the decoded frame of content in the secure memory areas of memory 102 to a display (330). If the display is a HDMI display, display processor 108 may determine if HDCP is enabled before outputting the decoded frame of content to the HDMI display.

Figure 4A:
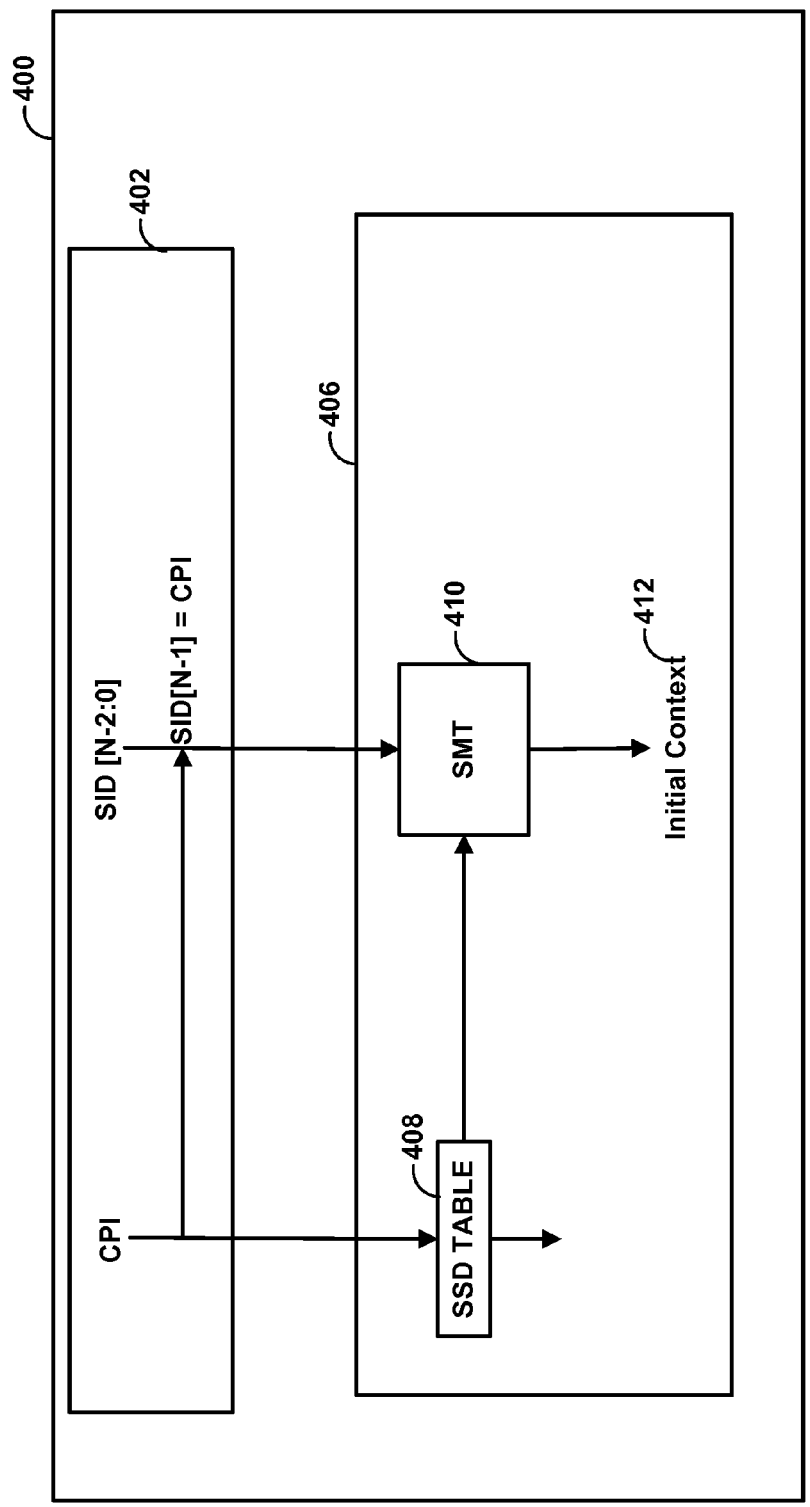
FIG. 4A is a block diagram illustrating a memory management unit (MMU) according to aspects of the disclosure.

FIG. 4A is a block diagram illustrating a memory management unit according to aspects of the disclosure. Components of a computing device, such as video decoder 106 and display processor 108 of computing device 100B shown in FIG. 1B, may include or otherwise utilize a memory management unit (MMU) to translate requests and to make accesses to memory, such as secure memory areas 202 shown in FIG. 2A or secure memory areas 204 shown in FIG. 2B. As shown in FIG. 4A, processor 400 may correspond to video decoder 106 or display processor 108 shown in FIG. 1B, or may correspond to a different processor of another system that makes use of the techniques of this disclosure. Processor 400 may include multimedia core 402, such as a video decoder core or a display processor core, and MMU 406. Multimedia core 402 may communicate with MMU 406, such as via an Advanced Microcontroller Bus Architecture (AMBA), to transact with memory, such as memory 102, via a memory interface, such as an AMBA Advanced eXtensible Interface (AXI). MMU 406 may include a secure status determination (SSD) table 408 and a stream matching table 410.

Multimedia core 402 may operate in secure mode and non-secure mode. If multimedia core 402 is operating in secure mode, a CP_IND may be set to 1. If multimedia core 402 is operating in non-secure mode, the CP_IND bit may be set to 0. A Stream ID (SID) may also be associated with a transaction from multimedia core 402. Multimedia core 402 may generate a client SID (cSID) by setting the most significant bit of the SID to CP_IND. As part of a transaction, multimedia core 402 may communicate the CP_IND bit and the cSID to MMU 406.

SSD table 408 may receive as input the CPI for the transaction and may determine if the transaction is secure. SSD table 408 may output a non-secure (NS) state for the transaction, where an NS state of 0 indicates that the transaction is secure and is capable of asserting APROTNS=secure on the system bus, while an NS state of 1 indicates that the transaction is non-secure and can only assert APROTNS=non-secure on the system bus. Stream matching table 410 may take as inputs the associated cSID of the transaction from multimedia core 402 as well as the NS state determination outputted by SSD table 408 indicating if the transaction is secure, and may output an initial context 412 for the transaction. The initial context 412 may be used by MMU 406 to access memory 102 using context banks, as discussed below with respect to FIG. 5.

Figure 4B:
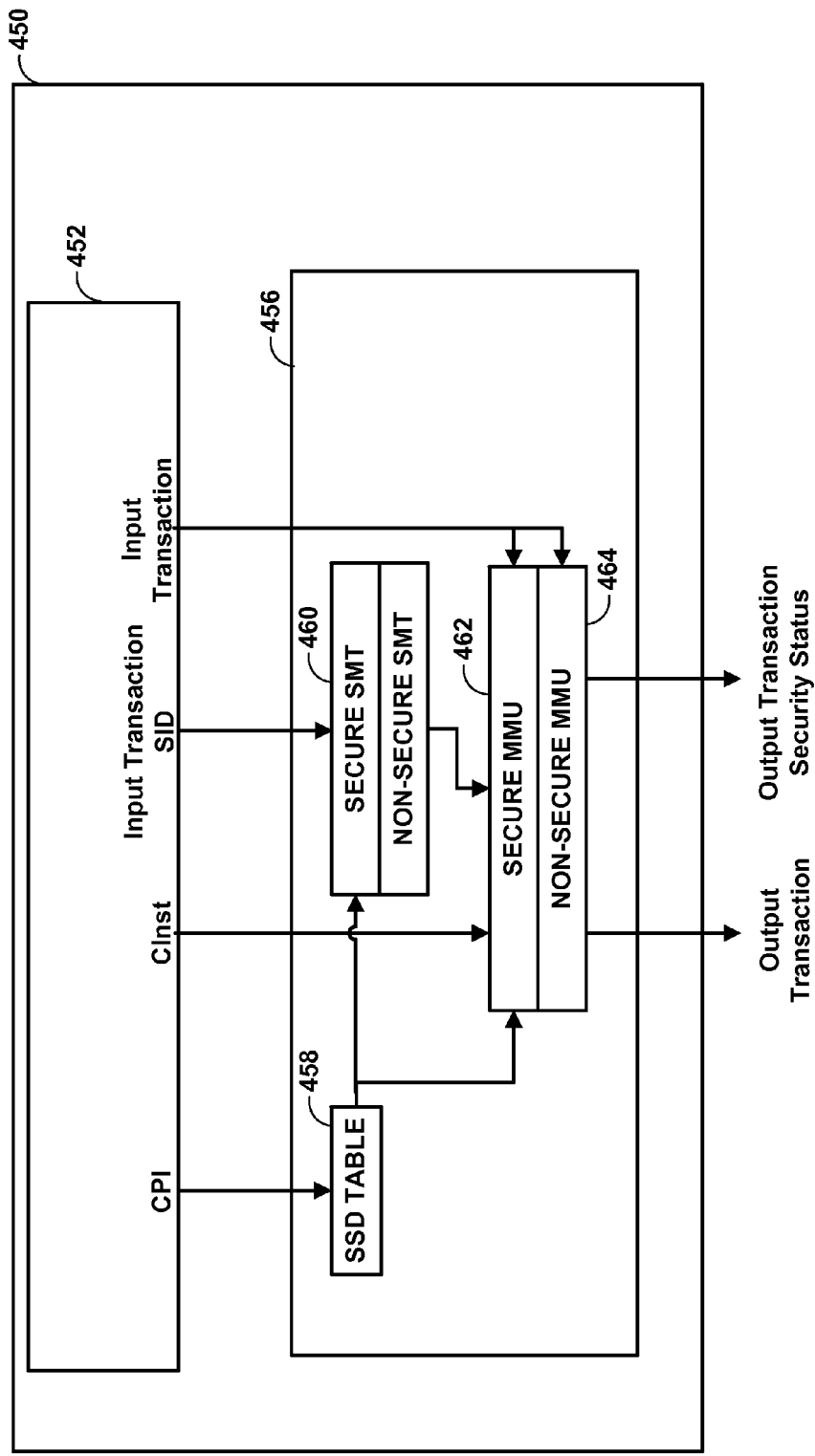
FIG. 4B is a block diagram illustrating an alternative memory management unit (MMU) according to aspects of the disclosure.

FIG. 4B is a block diagram illustrating an alternative memory management unit (MMU) according to aspects of the disclosure. As shown in FIG. 4B, processor 450 may correspond to video decoder 106 or display processor 108 shown in FIG. 1B, or may correspond to a different processor of another system that makes use of the techniques of this disclosure. Processor 450 may include multimedia core 452, such as a video decoder core or a display processor core, and MMU 456. Multimedia core 452 may communicate with MMU 456, such as via an Advanced Microcontroller Bus Architecture (AMBA), to transact with memory, such as memory 102, via a memory interface, such as an AMBA Advanced eXtensible Interface (AXI). MMU 456 may include a secure status determination (SSD) table 458 and a stream matching table (SMT) 450.

SMT 450 may be divided into secure and non-secure SMTs, while MMU 456 may also include a secure portion 462 and a non-secure portion 464. CInst signal may indicate instruction fetches from the core and this signal may be propagated to context selection and page selection logic. An XN bit in the page when accessed using CInst bit=1 from client port may raise an exception.

The secure status of each transaction may be driven using the CPI bit that in turn points to SMT 460. Stream matching logic for the secure portion of SMT 460 may be controlled by TrustZone 114, while stream matching logic for the non-secure portion of SMT 460 may be controlled by general purpose software.

Figure 5:
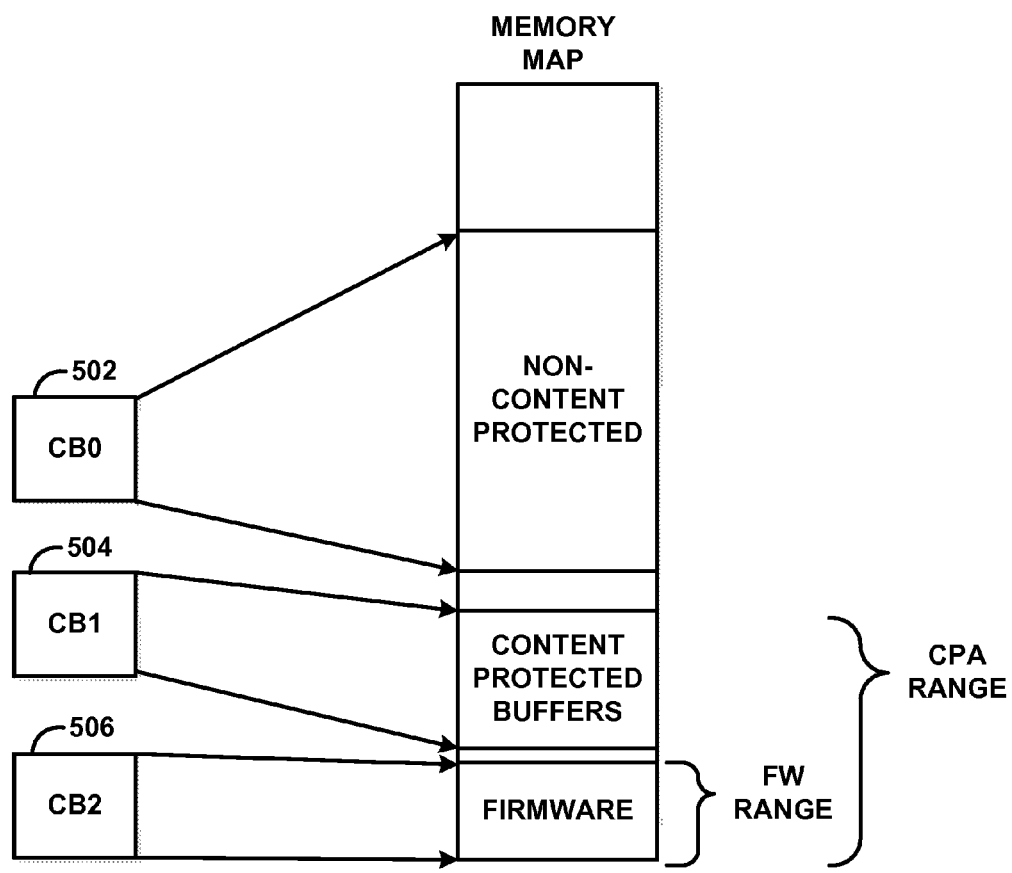
FIG. 5 is a block diagram illustrating context banks used by memory management units to access memory according to aspects of the disclosure.

FIG. 5 is a block diagram illustrating context banks used by memory management units to access memory according to aspects of the disclosure. Context banks may act as page tables to translate virtual address requests into physical addresses in memory, such as physical addresses in memory 102 shown in FIG. 1B. As shown in FIG. 5, MMUs, such as MMU 406 shown in FIG. 4A, may use three context banks. CB0 502, CB1 504, and CB2 506. CB0 502 may be configured to access memory outside of the copy protected address range, CB1 504 may be configured to access memory inside the copy protected address range, and CB2 506 may be configured to access the firmware memory region inside the copy protected address range. Context banks 502, 504, and 506 may include translation logic and/or mapping to act as page tables and translate virtual address requests into physical addresses in memory, such as memory 102. Transactions originating from a central processing unit client, which may have the first two most significant bits of its SID set to '1', may correspond to the only entries in stream matching table 410 that selects CB2 506. Transactions from clients that has the most significant bit of its cSID set to '1' may correspond to entries in stream matching table 410 that select CB1 504, and transactions from clients that has a most significant bit of its cSID at '0' may correspond to entries in stream matching table 410 that select CB0 502. In this way, access to the copy protected address range may be limited to secure clients and secure transactions. For example, MMU 406 in FIG. 4A may use context bank 504 to translate a virtual address from multimedia core 402 based on the initial context 412 generated by MMU 406. Table 1 is an exemplary table illustrating the entries of stream matching table 410 is illustrated in the following table:

TABLE 1

| Sub-client | cSID | Transaction Domain Status | Memory Access | CB Mapping |
|---|---|---|---|---|
| Non-secure ARM9 data | 0b00000000 | Non-content protection | Non-content protection accesses | CB0 |
| VSP_CMDIF | 0b00000001 | Non-content protection | Non-content protection accesses | CB0 |
| VSP_AP | 0b00000010 | Non-content protection | Non-content protection accesses | CB0 |
| VSP_SP_SG | 0b00000011 | Non-content protection | Non-content protection accesses | CB0 |
| VSP_CPU_DMA | 0b00000100 | Non-content protection | Non-content protection accesses | CB0 |
| VPP | 0b00000101 | Non-content protection | Non-content protection accesses | CB0 |
| CP ARM9 data | 0b10000000 | Content protection | Content protection accesses | CB1 |
| CP VSP_CMDIF | 0b10000001 | Content protection | Content protection accesses | CB1 |
| CP VSP_AP | 0b10000010 | Content protection | Content protection accesses | CB1 |
| CP VSP_SP_SG | 0b10000011 | Content protection | Content protection accesses | CB1 |
| CP VSP_CPU_DMA | 0b10000100 | Content protection | Content protection accesses | CB1 |
| CP VPP | 0b10000101 | Content protection | Content protection accesses | CB1 |
| Secure FW ARM9 data | 0b11000000 | Data access in protected FW | Content protection - ARM9 image accesses | CB2 |

TABLE 1-continued

| Sub-client | cSID | Transaction Domain Status | Memory Access | CB Mapping |
|---|---|---|---|---|
| Secure FW ARM9 inst | 0b11000110 | Inst access in protected FW | Content protection - ARM9 image accesses | CB2 |

Figure 6A:
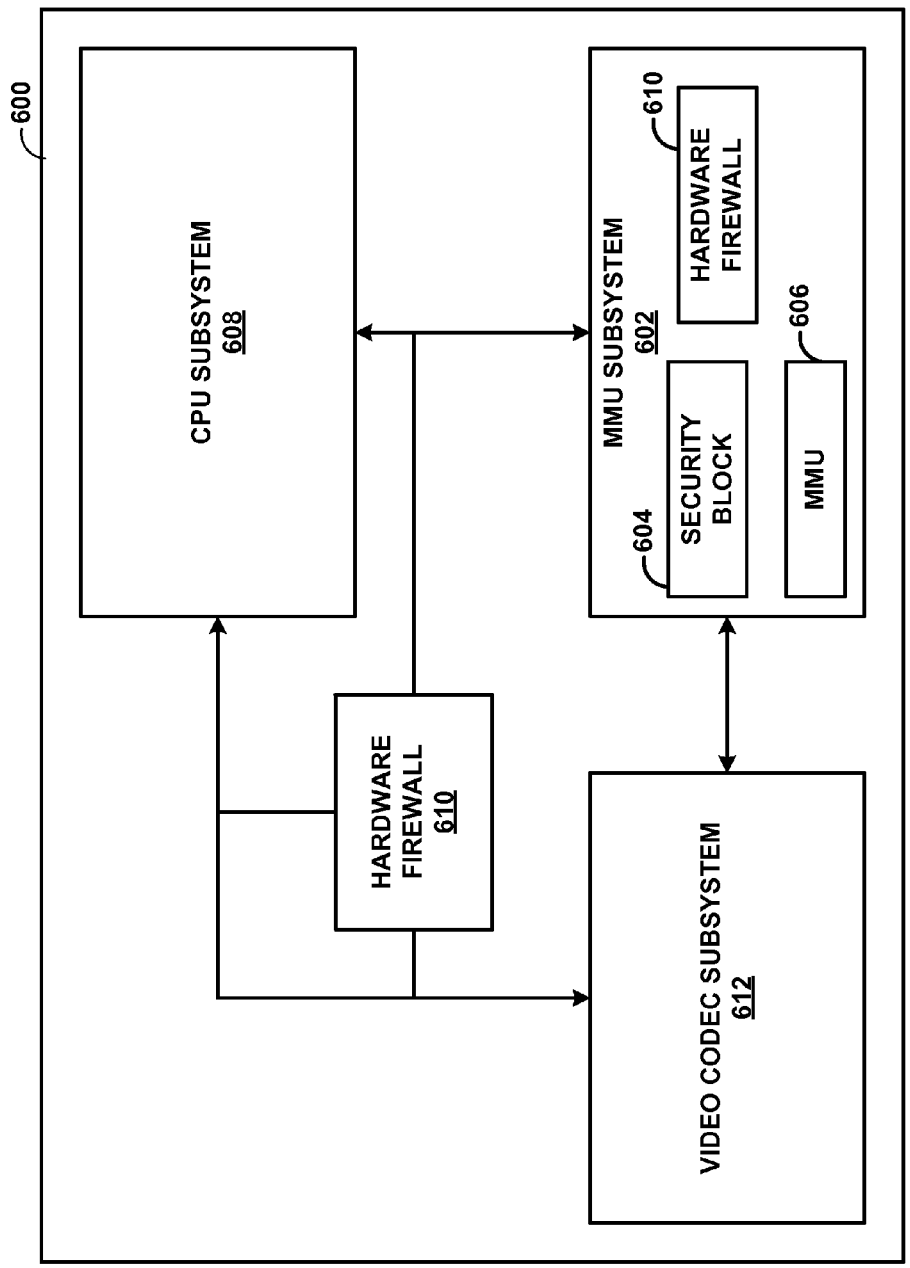
FIG. 6A is a block diagram illustrating a video decoder according to aspects of the disclosure.

FIG. 6A is a block diagram illustrating a video decoder according to aspects of the disclosure. As shown in FIG. 6A, video decoder 600 may correspond to video decoder 106 shown in FIG. 1B, or may correspond to a different video decoder of another system that makes use of the techniques of this disclosure. Video decoder 600 may include memory management unit (MMU) subsystem 602 that is programmed by video decoder firmware to enforce security rules regarding copy protected content. Video decoder 600 may also include hardware firewall 610 that enforces access control rules on register spaces in video decoder 600 to protect against external access to those register spaces. Video decoder 600 may also include processor subsystem 608 and video codec subsystem 612 that may be used to decide content. Example security rules enforced by MMU subsystem 602 may include that the copy-protected content processed by video decoder 600 may remain secure and protected in a protected session only if both the input and output buffers of video decoder 600 falls within the copy protected address range of secure memory areas, such as secure memory areas 202 or 204 shown in FIGS. 2A and 2B. If for example the output buffer of video decoder 600 does not fall within the address range of secure memory areas, the MMU subsystem 602 may terminate the protected session and may send a notification of the violation.

MMU subsystem 602 may include MMU 606, such as MMU 406 shown in FIG. 1, as well as security block 604. Security block 604 is programmed and queried by video decoder firmware and TrustZone 114. Security block 604 may include CPA Start and CPA End registers representing the content protected virtual address range of secure memory areas in memory, which MMU subsystem 602 may use to determine if the input or output buffers do not fall within that ange. Security block 604 may also include FW Start and FW End registers that represent the secure firmware virtual address range within the content protected virtual address range that denote the virtual address range where the video decoder firmware for video decoder 600 is stored. Security block 604 may also include SID Secure Registers that represent the set of stream IDs (SIDs) that security block 604 recognizes as being protected (i.e., originating from a content protection context). SIDs may be associated with clients and/or client requests/transactions transmitted by busses to video decoder 600. If a client or transaction is associated with an SID that security block 604 recognizes as being protected, then that client or transaction is allowed access to the content protected memory. The registers are listed in the following Table 2:

TABLE 2

| Register | Usage | Reset Value |
|---|---|---|
| SEC_SID_0_SECURE SEC_SID_1_SECURE SEC_SID_2_SECURE SEC_SID_3_SECURE SEC_SID_4_SECURE SEC_SID_5_SECURE | This set of registers represents the set of SIDs, where SEC_SID_X_SECURE represents SID = X. A register value of '1' indicates that the corresponding SID is protected and may have access to the content protected memory within the CPA range. A register value of '0' indicates that the SID is non-protected and may only be permitted to access the non-protected memory outside of the CPA range. | 0x00000000 (all registers) |
| SEC_CPA_START | The start address of the secure virtual address range. The CPA range encompasses the FW image region. | 0x00000000 |
| SEC_CPA_END | The end address of the secure virtual address range. The CPA range encompasses the FW image region. | 0x00000000 |
| SEC_FW_START | The start address of the secure FW virtual address range. | 0x00000000 |
| SEC_FW_END | The end address of the secure FW virtual address range. | 0x00000000 |

Figure 6B:
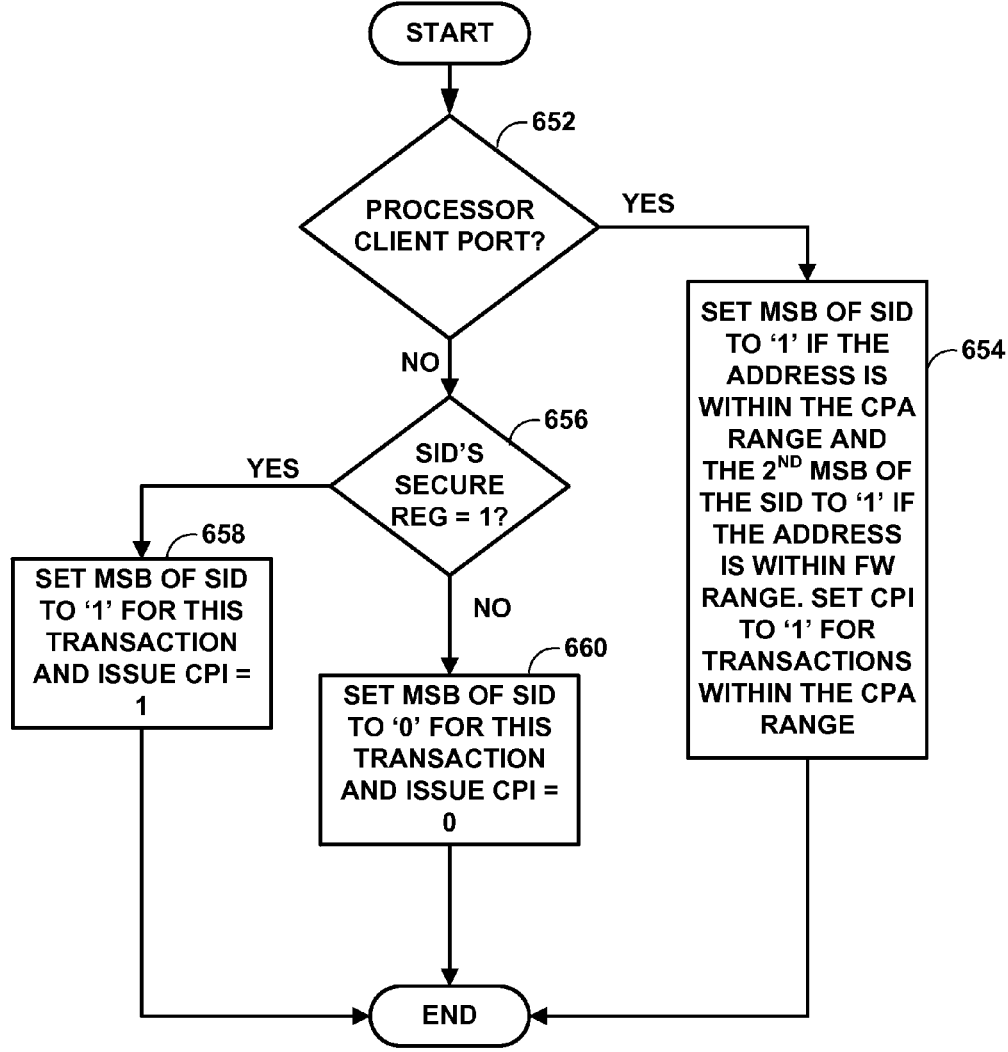
FIG. 6B is a flowchart illustrating a process performed by security block according to aspects of the disclosure.

FIG. 6B is a flowchart illustrating a process that may be performed by a security block according to aspects of the disclosure. As shown in FIG. 6B, security block 604 may perform the process to determine if the request received by video decoder 600 originates from a content protection context (i.e., from a client that is allowed access to the protected memory). Security block 604 may determine if the transaction originated from a processor client port (e.g., originated from processor subsystem 608 of video decoder 600) (652). If the transaction did originate from a processor client port, security block 604 may set the most significant bit of the SID for this transaction to '1' if the address the transaction is accessing is within the content protected virtual address range, and may set the second most significant bit of the SID for this transaction to '1' if the address the transaction is accessing is within the firmware virtual address range (654). Setting the most significant bit of the SID to '1' may indicate that the transaction is allowed to select a copy protected context bank (discussed below).

If the transaction did not originate from a processor client port, security block 604 may determine if the transaction's secure register (e.g., one of the SEC_SID_X_SECURE registers in the table above) is set to 1 (656). If the transaction's secure register is set to 1, then security block 604 may set the most significant bit of the transaction's SID to '1' and may issue a CPI=1 for this transaction (658). If the transaction's secure register is not set to 1, then security block 604 may set the most significant bit of the transaction's SID to '0' and may issue a CPI=0 for this transaction (660). CPI=1 may be an indication that the transaction is from a content protection agent, while CPI=0 may be an indication that the transaction is not from a content protection agent.

Figure 7A:
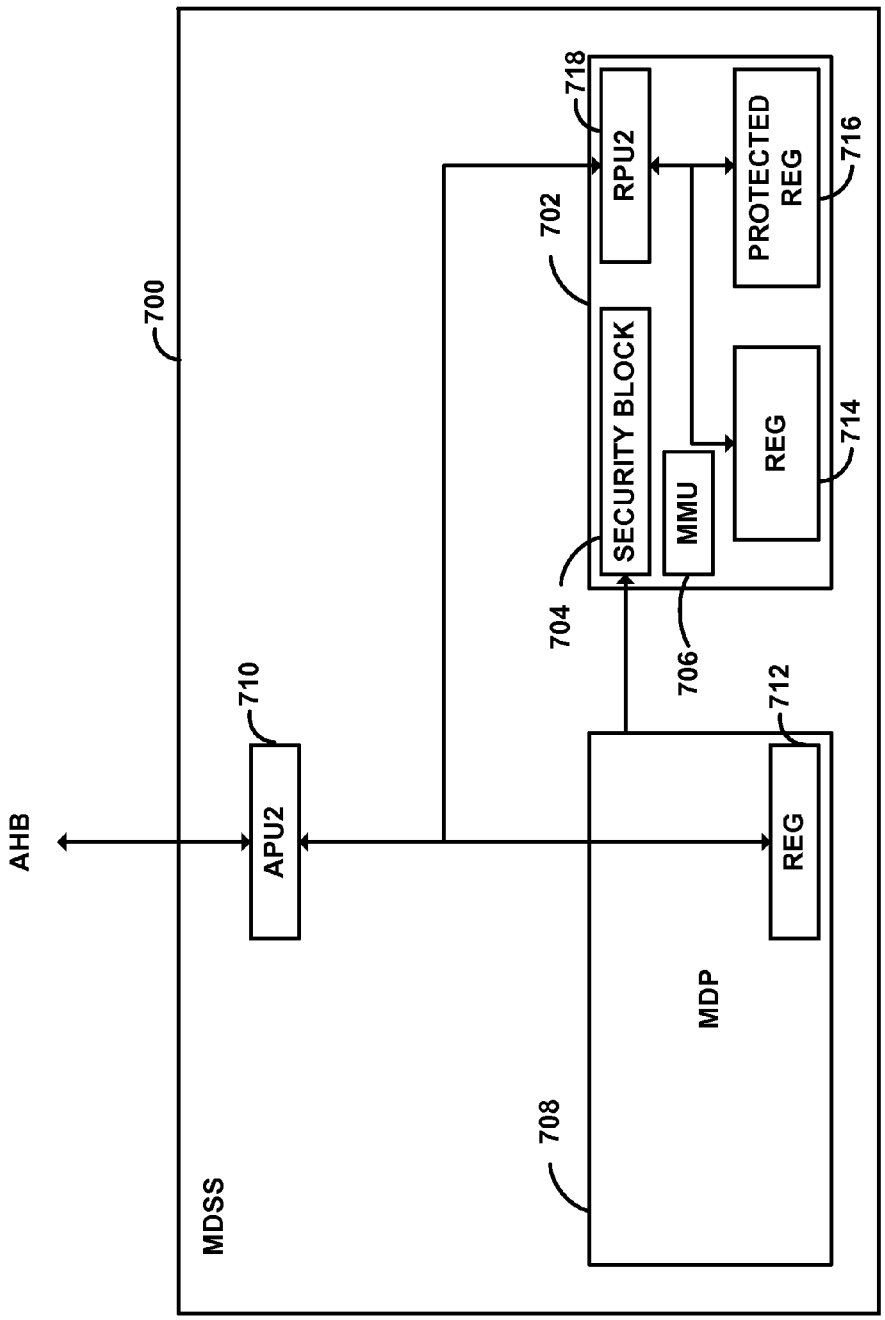
FIG. 7A-7C are block diagrams illustrating display processor 108 according to aspects of the disclosure.
Figure 7B:
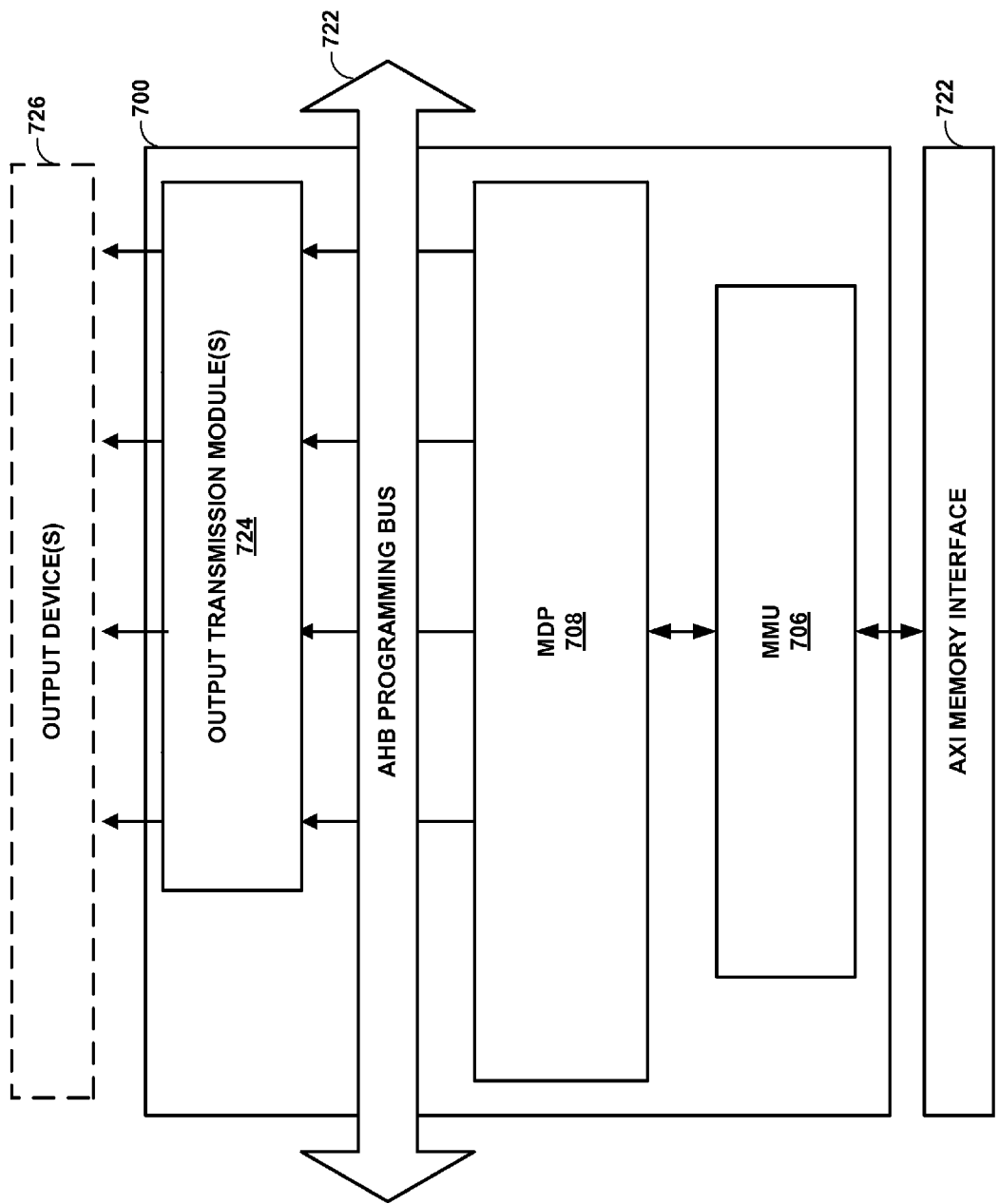
Figure 7C:
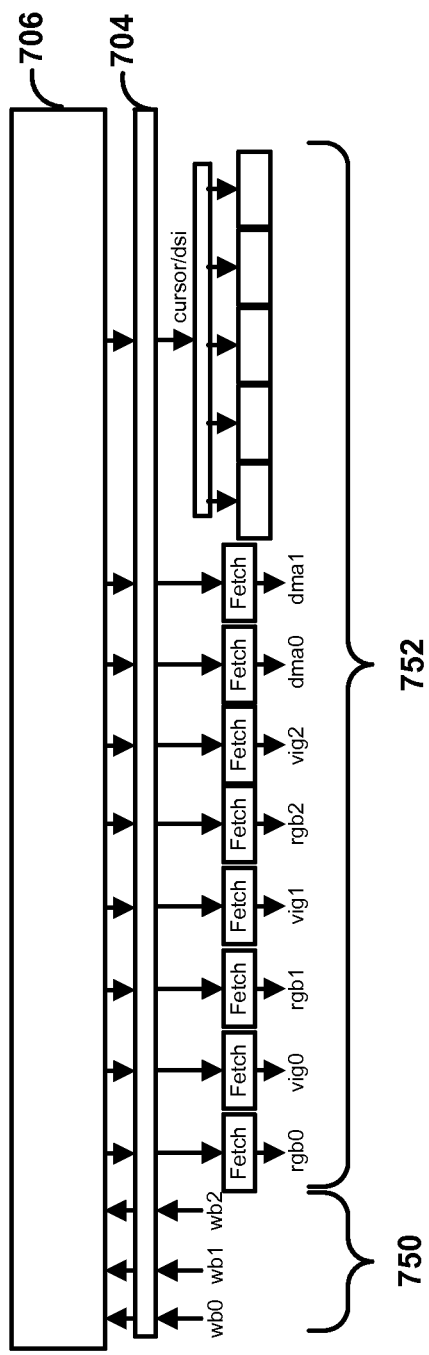

FIG. 7A-7C are block diagrams illustrating an example of a display processor according to aspects of the disclosure. As shown in FIGS. 7A and 7B, display processor 700 may correspond to display processor 108 shown in FIG. 1B, or may correspond to a different display processor of another system that makes use of the techniques of this disclosure. Display processor 700 may include MMU subsystem 702 and mobile display processor (MDP) 708. MMU subsystem 702 may include security block 704 and MMU 706, such as MMU 406 shown in FIG. 4A. Display processor 700 may include access protection unit (APU2) that protects registers, such as registers 712 and 714. MMU subsystem 702 may also include register protection unit (RPU) 718 that protects certain registers in MMU subsystem 702, such as protected register 716, while other registers such as register 714 may remain unprotected. Display processor 700 may include access protection unit (APU) to protect display processor 108 from unauthorized access.

Similar to MMU subsystem 602 of video decoder 600 shown in FIG. 4A, MMU 706 may enforce security rules regarding copy protected content. MMU 706 may receive, from MDP clients in display processor 700, requests for data from memory via a bus, such as AXI bus, and the bus may indicate if the requests are from a copy protected context via an associated cSID signal, where a low (e.g., '0') most significant bit in the cSID signal indicates non-content protected access while a high (e.g., '1') most significant bit of the cSID signal indicates content protected access. MDP 708 may have the responsibility to drive the most significant bit of the cSID signal. For every access request by every client the access may be checked to determine if the memory access is secure. MDP 708 may rely on software (e.g., display processor driver 120 shown in FIG. 1B) to program the status and/or type of access and may assert the most significant bit of the associated cSID signal appropriately. As discussed above with respect to FIG. 5, asserting the most significant bit of the associated cSID may be important for accessing the correct context bank to translate a virtual address associated with the access request to a physical address. MMU 706 may make accesses to memory, such as memory 102 shown in FIG. 1B, based on the access requests via AXI memory interface 722. MDP 708 may communicate video content to output transmission modules 724 via AHB programming bus 722, so that output transmission modules 724 may render the video content at output devices 726.

As shown in FIG. 7C, multiple clients of MDP 708 may connect to MMU 706 to read from and write to memory, such as memory 102 shown in FIG. 1B. The clients may be consolidated into a single AXI port by MMU 706. The clients may be grouped into write clients 750 that write to memory 102 and read clients 752 that read from memory.

Read clients 752 may include rgb1, rgb2, and rgb3, vig1, vig2, and vig3, dma0 and dma1, and a cursor client. Write clients 750 may include:

wb0: write back for rotation path or line write back path;
wb1: write back for rotation path or line write back path that may be necessary to achieved the desired performance because MDP 708 may support very high resolutions; and
wb2: write back path to support wireless display or concurrent write back functionality.

The write clients 750 and read clients 752 may access MMU 706 with a generic client interface protocol to request data from memory 102, and these accesses may be translated by MMU 706 to AXI requests. The AXI interface may provide support to indicate protected access to memory via cSID signals. MMU 706 may receive content protection information from a client port. Thus, MDP 708 may be responsible for correctly driving the most significant bit of the cSID so that it is reflected on the AXI port. Therefore, for every fetch made by a client of MDP 708, the request may be checked to determine if the memory access is secure.

Figure 8A:
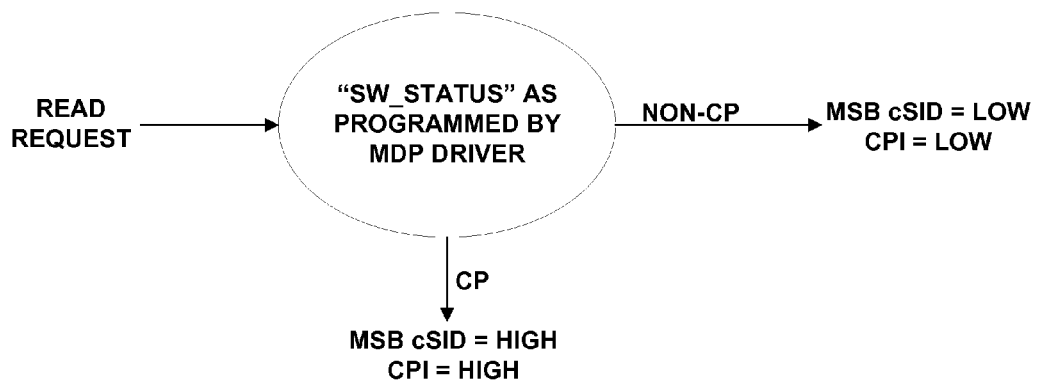
FIG. 8A is a flow diagram illustrating a process of receiving a read request by a display processor according to aspects of the disclosure.

FIG. 8A is a flow diagram illustrating a process of receiving a read request by a display processor, such as display processor 700 shown in FIG. 7A or display processor 108 shown in FIG. 1B, according to aspects of the disclosure. As shown in FIG. 8A, a display processor driver, such as display processor driver 120 shown in FIG. 1B, may program a SW_STATUS register for the read request to indicate the content protection status of the read request. MDP 708 may read the register and, if the SW_STATUS register indicates that the read request is content protected, then set the most significant bit of the associated cSID signal to '1' and may set a CPI signal to '1'. Conversely, if the SW_STATUS register indicates that the read request is not content protected, then MDP 708 may set the most significant bit of the associated cSID signal to '0' and may set the CPI signal to '0'. SW_STATUS registers are not protected by a hardware firewall and may be in generic display processor register space.

Figure 8B:
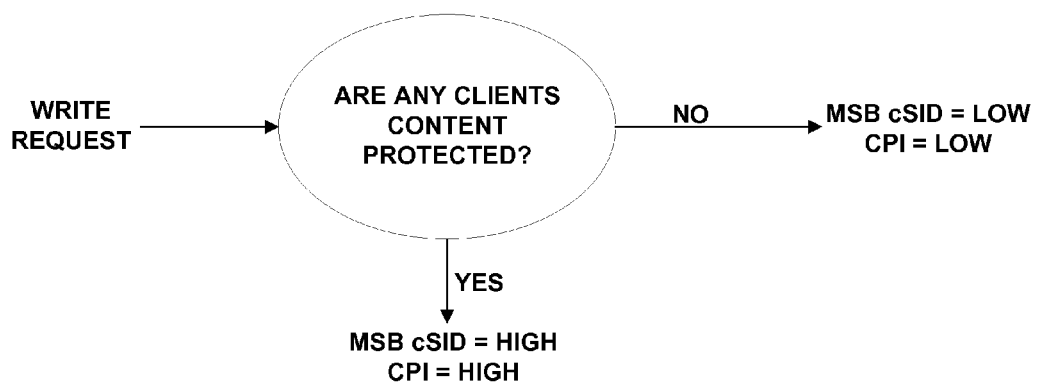
FIG. 8B is a flow diagram illustrating a process of receiving a write request by a display processor according to aspects of the disclosure.

FIG. 8B is a flow diagram illustrating a process of receiving a write request by a display processor, such as display processor 700 shown in FIG. 7A or display processor 108 shown in FIG. 1B, according to aspects of the disclosure. As shown in FIG. 8B, MDP 708 may determine if any clients are content protected. If so, MDP 708 may set the most significant bit of the associated cSID signal to '1' and may set a CPI signal to '1'. Conversely, if none of the clients are content protected, MDP 708 may set the most significant bit of the associated cSID signal to '0' and may set the CPI signal to '0'.

Figure 8C:
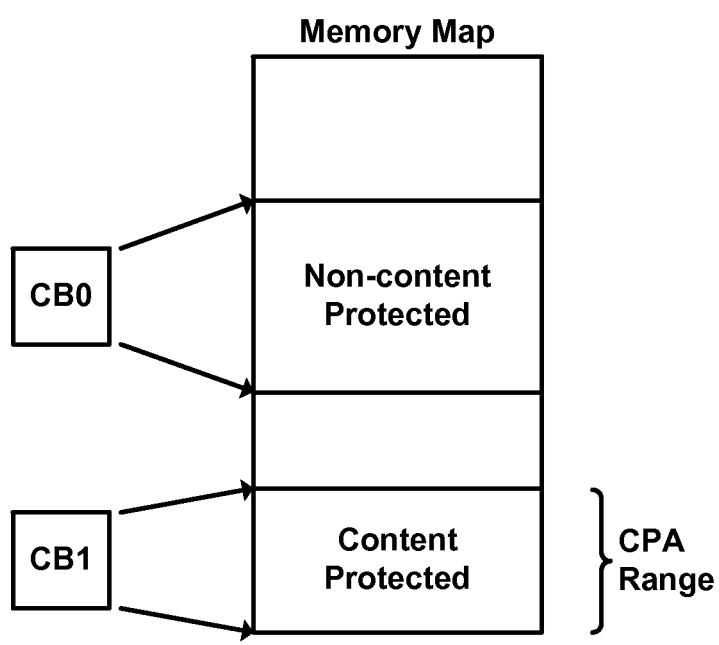
FIG. 8C is a block diagram illustrating context banks used by the display processor's memory management unit to access memory according to aspects of the disclosure.

FIG. 8C is a block diagram illustrating context banks used by a display processor's MMU, such as MMU 706 shown in FIG. 7A, to access memory according to aspects of the disclosure. As shown in FIG. 8C, a display processor, such as display processor 700 shown in FIG. 7A or display processor 108 shown in FIG. 1B, may use two memory banks: CB0 and CB1. CB0 may map to non-content protected memory access and CB1 may map to content protected memory access, such as shown in Table 3:

TABLE 3

| Client | cSID | Transaction Domain Status | Memory Access | CB Mapping |
| --- | --- | --- | --- | --- |
| All clients | 0b0xxxx | Non-content protection | Non-content protection accesses | CB0 |

TABLE 3-continued

| Client | cSID | Transaction Domain Status | Memory Access | CB Mapping |
|---|---|---|---|---|
| All clients | 0b1xxxx | Content protection | Content protection accesses | CB1 |

Once the context bank is selected, MMU 706 may attempt to translate the virtual address of the request into a physical address in memory. If the translation is successful, then the access to memory is granted. Otherwise, a page fault may occur. Table 4 shows these different virtual address translation scenarios:

TABLE 4

| cSID | MMU Translated | Result |
|---|---|---|
| NCP | No | Page fault. |
| NCP | Yes | Non-content protected access. |
| CP | No | Page fault. |
| CP | Yes | Content protected access. |

As discussed above, SW_STATUS registers may be used to determine the content protection status of read requests. However, SW_STATUS registers are not protected by a hardware firewall and may be in generic display processor register space. Even though SW_STATUS registers are not protected by hardware firewalls, the following Table 5 illustrates how accesses to display processor registers may be handled by MMU 706:

TABLE 5

| Input Buffer Status | SW Status | Output Status | HW CP Status | Result/ Comments |
|---|---|---|---|---|
| CP | NCP | CP | NCP | Input will be blocked outside of MDP since MDP HW will indicate a NCP access when it tries to access a CP buffer which will violate the access due to inconsistencies. The write out to memory will not be successful either since the output status is CP but the hardware will drive a NCP access. The access will result in a page fault. |
| CP | NCP | NCP | NCP | Input will be blocked outside of MDP since MDP HW will indicate a NCP access when it will tries to access a CP buffer which will violate the access due to inconsistencies and result in page fault. The write out to memory will be successful since the output status is NCP and the hardware will drive a NCP access. The data will not be the true content but whatever has been returned to MDP. |
| CP | CP | NCP | CP | The read data will be successful since the MDP HW will indicate a CP access to a CP space which is valid. The output will not be successful since MDP hardware will be driving a CP access to NCP space which will result in a page fault. |
| CP | CP | CP | CP | The read data will be successful since the MDP HW will indicate a CP access to a CP space which is valid. The write out will also be successful since the MDP hardware will be driving a CP access to a CP space. |
| NCP | CP | NCP | CP | Input will be blocked outside of MDP since MDP HW will indicate a CP access when it will try to access a CP buffer which will violate the access due to inconsistencies and result in page fault. The output will not be successful since MDP hardware will be driving a CP access to NCP space which will result in a page fault. |
| NCP | CP | CP | CP | Input will be blocked outside of MDP since MDP HW will indicate a CP |

TABLE 5-continued

| Input Buffer Status | SW Status | Output Status | HW CP Status | Result/Comments |
|---|---|---|---|---|
| | | | | access when it will try to access a NCP buffer which will violate the access due to inconsistencies and result in page fault. The output will be successful since MDP hardware will be driving a CP access to CP space. However, the data will be whatever is returned to the MDP. |
| NCP | NCP | CP | NCP | The read data will be successful since the MDP HW will indicate a NCP access to a NCP space which is valid. The output will not be successful since MDP hardware will be driving a NCP access to CP space which will result in a page fault. |
| NCP | NCP | NCP | NCP | The read data will be successful since the MDP HW will indicate a NCP access to a NCP space which is valid. The output will be successful since MDP hardware will be driving a NCP access to NCP space. |

Input Buffer Status—The state of the input buffer as known and programmed by TrustZone 114.
SW Status—The security status/type as programmed by the display processor driver 120 and which the MDP 708 uses to generate the most significant bit of cSID on the client side to the MMU 706.
Output Status—The state of the output buffer as programmed by TrustZone 114.
CP—Indicates content protection.
NCP—Indicates Non-content protection.

Thus, the only valid conditions that lead to successful completion may include the conditions that if everything is copy protected or the conditions that if everything is not copy protected, and security is not compromised in display processor 700 even if the SW_STATUS register is not protected by hardware.

Figure 9:
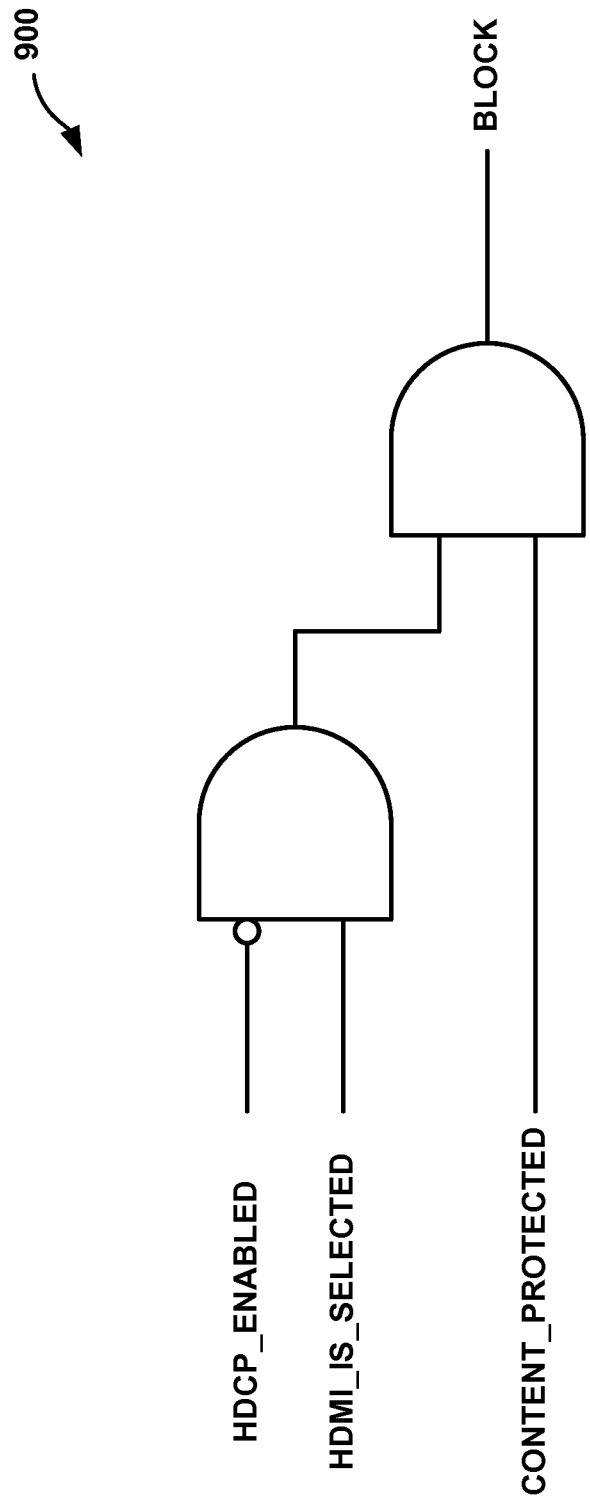
FIG. 9 is a block diagram illustrating hardware logic for determining whether to allow display of copy protected content onto HDMI devices according to aspects of the disclosure.

If the copy protected content is to be driven to high definition multimedia interface (HDMI) devices, a requirement may be enforced that require enabling of high-bandwidth digital copy protection (HDCP). A display processor, such as display processor 108 shown in FIG. 1B, may include the hardware to appropriately handle this situation. FIG. 9 is a block diagram illustrating hardware logic for determining whether to allow display of copy protected content onto HDMI devices according to aspects of the disclosure. As shown in FIG. 9, the display processor may include hardware logic 900 that blocks HDMI content if protected content is to be output, if HDMI is selected as the output interface, and if HDCP is not enabled.

Figure 10:
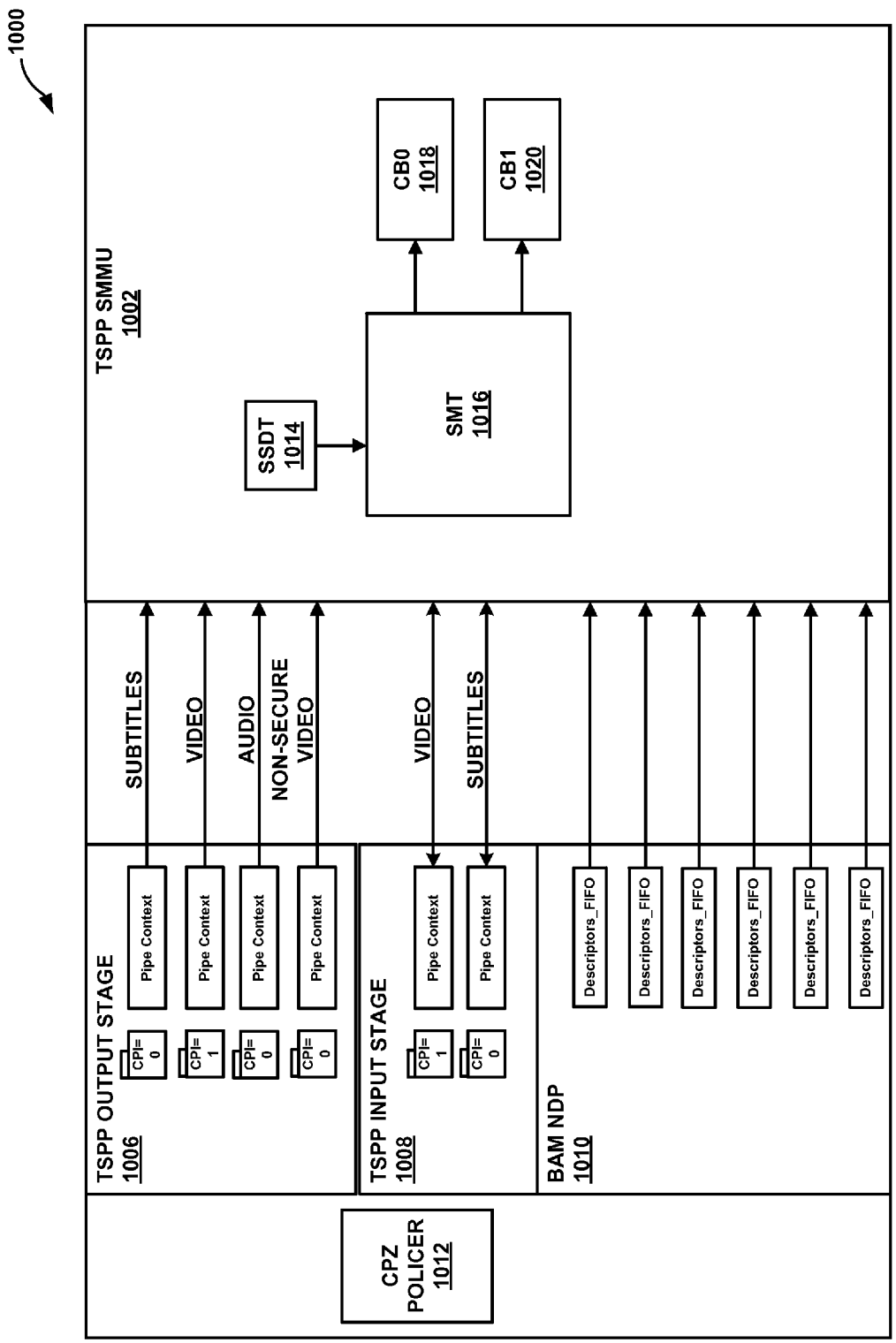
FIG. 10 is a block diagram illustrating a transport stream packet processor according to aspects of the disclosure.

FIG. 10 is a block diagram illustrating a transport stream packet processor (TSPP) according to aspects of the disclosure. As shown in FIG. 10, TSPP 1000, similar to TSPP 110 shown in FIG. 1B, may include a TSPP secure memory management unit (SMMU) 1002, a content protection zone (CPZ) policer 1012, bus access manager (BAM) no data path (NDP) 1010, TSPP Output Stage 1008, and TSPP Input Stage 1006.

TSPP 1000 may receive transport streams comprising multimedia data and may process the received transport streams, such as by demultiplexing the received transport streams, so that the received multimedia data may be processed by other components of a computing device, such as computing device 100B shown in FIG. 1B, such as video decoder 106 and display processor 108 shown in FIG. 1B. At TSPP initialization, TrustZone 114 may configure TSPP 1000 so that TSPP 1000 contains static configurations that indicate what types of content are protected.

CPZ policer 1012 may enforce content protection rules in hardware, and to ensure that the output of every transport stream packet which is processed by TSPP 1000 follows a specified set of rules. CPZ policer 1012 may compute, for each packet write, whether or not the output is allowed. In case HLOS configured TSPP 1000 according to CPZ policer 1012 rules the data path will stream content. If an attack was attempted by HLOS software, the content may be dropped by CPZ policer 1012 and a security violation interrupt may be asserted by TSPP 1000.

BAM NDP 1010 may provide a hardware-software interface that manages buffers and notifications. Because buffer management is performed from HLOS, and thus may always be non-protected, the CPI bit is disabled. All pipes in BAM NDP 1010 may share the same SID. TSPP output stage 1006 may be responsible for writing data to the bus via TSPP SMMU 1002. Each BAM producer pipe in TSPP output stage 1006 may have a separate context which is configured with the CPI bit by TrustZone 114. A pipe context with CPI bit enabled is considered secured. Each context may also have a separate and fixed SID. TSPP input stage 1008 may be responsible for reading input buffers via TSPP SMMU 1002. Each BAM consumer pipe in TSPP input stage 1008 may have a separate context which is configured with the CPI bit by TrustZone 114. A consumer pipe context with CPI bit enabled is considered secured. Each context may also have a separate and fixed SID TSPP SMMU 1002 may include Secure Status Determination Table (SSDT) 1014, Stream Matching Table (SMT) 1016, and two context banks CB0 1018 and CB1 1020. CB1 1020 may be a secure context bank and CB0 1018 may be a non-secure context bank. Context banks CB0 1018 and CB1 1020 may be mapped to the relevant VMIDs when going out to the bus. The mapping tables may be fixed. The SID will be appended to the CPI bit and mapped to CB0 1018 and CB1 1020. All 0x1xxxxx SIDs may be mapped to secure context bank CB1 1020 and all 0x0xxxx SIDs may be mapped to non-secure context bank CB0 1018.

Figure 11:
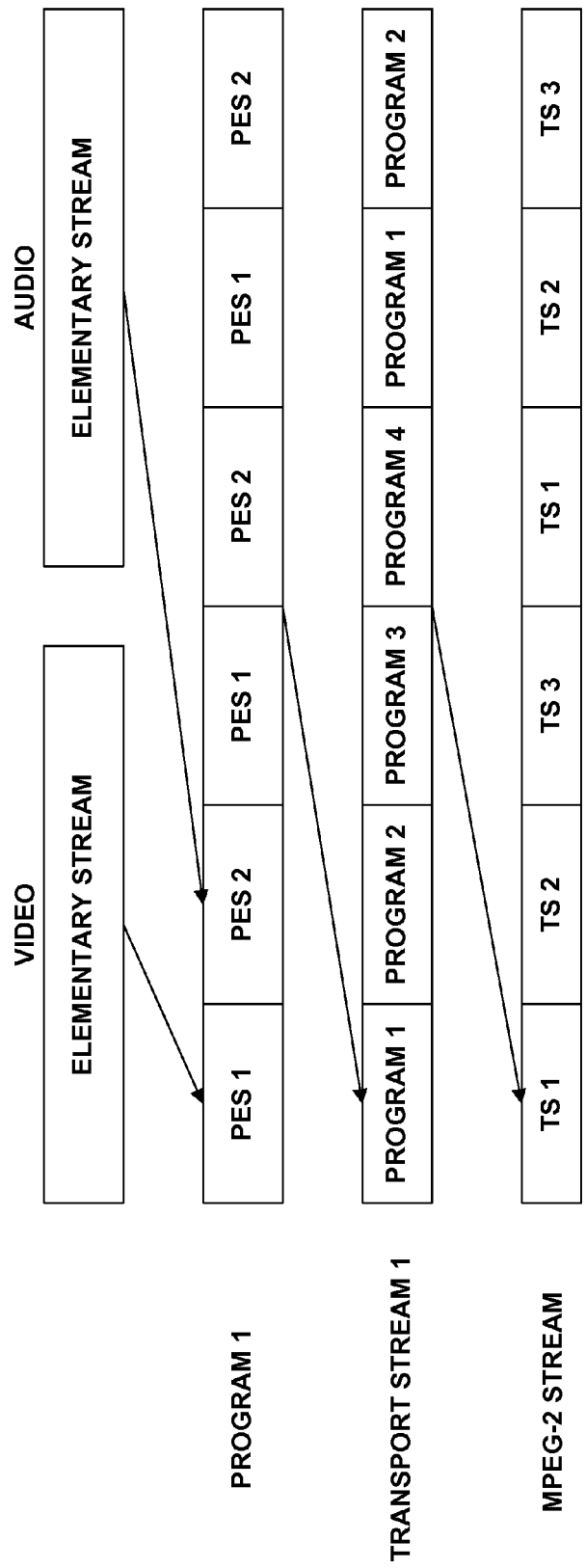
FIG. 11 is a block diagram illustrating transport stream structure and data according to aspects of the disclosure.

FIG. 11 is a block diagram illustrating transport stream structure and data according to aspects of the disclosure. As shown in FIG. 11, a MPEG-2 transport steam may comprise a multiplex of several elementary streams, each having its own packet identifier (PID). The MPEG-2 transport stream may be a common container for streaming video, audio and other data, and is widely used in broadcast and streaming systems (DVB, ATSC, IPTV, DLNA, etc.).

Each stream within the multiplex of elementary streams may either be a packetized elementary stream (PES) or a section stream. PESs may be used to stream video, audio and subtitles. Section streams may be used to broadcast program and service information (PSI/SI) tables which describe the multiplex. A program or a service may be composed of several streams. For example, a CNN broadcast may comprise audio, video, subtitles, and PSI/SI streams. In the same multiplex, ESPN and Sky broadcasts may also be included together with the CNN broadcast.

A transport stream packet may have a fixed size of 188 bytes, out of which at least 4 bytes are the header and the rest may be the payload. In order to protect access for specific services, the broadcaster may encrypt the transport streams that belong to these services. Transport stream encryption may be performed at a TS packet level: the packet header may always in the clear while the payload may be encrypted. Typically, only the video stream may be encrypted. It may be the chipset responsibility to decrypt the streams and protect their content from copy/storage/theft according to its usage rules.

TSPP processing and flows may be configured by the HLOS. This configuration may include the inputs, processing, output format and output pipes. Because the HLOS may not be trusted to configure paths that protect the content protection zone, this gap may be filled by CPZ policer 1012 in TSPP 1000.

TSPP 1000 may receive inputs from a physical transport stream interface (TSIF) which is connected to a demodulator or a conditional access module. This interface is non-secure and the data carried over it is protected by encryption. TSPP 1000 may also receive such input from RAM via a non-secure BAM pipe. The use case for this may include flavors of IPTV which encrypt the data at the transport stream level and personal video recorder playback.

TSIF/NS Pine Rules (Shown in Table 6)

TABLE 6

| Output Format | Processing | Stream Type | Producer (Output) Pipe Protection Enforcement | Comments |
|---|---|---|---|---|
| Raw | Decrypt == no | Don't care | NS pipe | The packets are either encrypted or came in the clear and do not require access protection |
| Raw | Decrypt == yes && Encrypt == no | Don't care | Secure pipe | The TSPP can't determine the stream format (PES\sections) or type (audio\video\etc.) when outputting raw packets. It must assume the packets are carrying video and need to be protected further. |
| Raw | Encrypt == yes | Don't care | NS pipe | Any content which leaves the TSPP encrypted doesn't have to be access protected |
| PES | Decrypt == no | Don't care | NS pipe | The packets are either encrypted or came in the clear and do not require access protection |
| PES | Decrypt = yes | Included in the Protected PES Type List | Payload to secured pipe Header may go to NS pipe | none |
| PES | Decrypt = yes | Not included in the Protected PES Type List | Payload to NS pipe Header may go to NS pipe | none |

TSPP 1000 may provide hardware acceleration to mpeg2 demultiplexing and decryption. There may be instances where the decryption capabilities of TSPP 1000 are not used, but the demultiplexing features of TSPP 1000 may still be used.

The decryption for these use cases may be performed in bulk mode and the transport stream may be treated as any bit stream. The output of the decryption may be fed into the TSPP 1000 for demultiplexing. Since the content is in the clear, it may be access protected and may go through secure consumer pipes.

For non-secure inputs only the transport stream packets of the desired elementary stream may be encrypted (video). Secure pipes may treat the whole transport stream packets at the same level of security Secure Pipe Rules (Shown in Table 7)

TABLE 7

| Output Format | Processing | Stream Type | Producer (Output) Pipe Protection Enforcement | Comments |
|---|---|---|---|---|
| Raw | Encrypt == no | Don't care | Secure pipe | The raw packets may carry protected or non-protected data - that can't be determined by the TSPP. The default is to protect |
| Raw | Encrypt == yes | Don't care | NS pipe | Data is being protected by encryption |
| PES | N/A | Included in the Protected PES Type List | Payload to secured pipe Header to NS pipe | none |
| PES | N/A | Not included in the Protected PES Type List | Payload to NS pipe Header to NS pipe | none |

TrustZone 114 may configure TSPP 110 at initialization with the following information which may not be changed during runtime:

The stream type (stream_id) may be transmitted as part of the PES header and may be parsed by TSPP 110 during PES assembly. It may be possible to configure up to 10 secured PES types. Each PES type may have a 8-bit value and a 8-bit mask For example, a PES type of video may include: value: 11100000 mask: 11110000, DSC-CC would be value: 11110010 mask: 11111111 The default list may include only video: value: 11100000 mask: 11110000

TSPP 110 may allow configuration of up to 10 PID filters. Each filter may be made up of a value and mask (similar to all PID filters in TSPP 110). The default list may include PAT, NIT, CAT, TSDT which may be carried in PID 0, 1 and 2 respectively. TrustZone 114 may configure the CPI bit of producer and consumer pipes at channel switch.

Broadcast middleware software may be aware of which PIDs are encrypted according to descriptors in the Program Map Table. When those PIDs are selected in the demux driver a producer pipe may be specified as well. HLOS software may request TrustZone 114 to secure that pipe. TrustZone 114 may enable the CPI bit in order to lock the pipe. Failing to set the CPI bit will result in security violation interrupts which may be asserted by CPZ policer 1012 in TSPP 110 and the data may be discarded. During service tear down HLOS software may request TrustZone 114 to unlock the pipe by disabling the CPI bit.

The middleware of all technologies that use protected consumer pipe (DLNA/CPRM/Blu-ray) may request TrustZone 114 to secure the consumer pipe by enabling the CPI bit. Failing to set the CPI bit may result in leakage of protected content. TSPP 110 may treat the content as non-protected (since no decryption will take place inside the TSPP 110) and may route the output to HLOS buffers. During tear down the HLOS may ask TrustZone 114 to unlock the consumer pipe by disabling the CPI bit.

A television player may be running in the HLOS. It may manage the data pipe from the source node (demux), through the decoder to the display. In addition it may also handle the clock recovery (PCR) and A\V sync.

Each video frame that needs to undergo decoding and display may be encapsulated in a single PES packet. The timing information may be included in the PES header and the compressed frame may be included in the PES payload. The access protection mechanism may be applied just on the payload.

Since a pipe context represents a single buffer and uses a single MMU context banks it may be necessary to separate in hardware the PES header from the payload. Each video stream may be routed to two different pipes: a header pipe and a payload pipe. A pointer to the payload may be appended to the PES header to easily associate a header to a payload.

As described above, some of the streams are sent to secure buffers because the content they carry can't be determined by TSPP 110. A secured demultiplexer in TrustZone 114 may act as an extension of CPZ policer 1012. Some of the data may reach TrustZone 114 even though it may not be meant to be protected (for example PSI sections). TrustZone 114 may determine whether or not such unprotected data may be copied to non-secure buffers to be used by HLOS.

PES PIDs may be handled by CPZ policer 1012, so the input to the secure demultiplexer may be raw transport stream packets that carry sections. However, because HLOS may be used to command TSPP 110 to send raw packet of PES PIDs to TrustZone 114, the secure demultiplexer may not be able to rely on an assumption that the content is structured in sections. Rather, the secured demultiplexer may verify that indeed the content is structured in sections.

In order to determine that the secure demultiplexer is copying the sections to non-secure buffer, it may first successfully assemble the sections. A successful assembly may be one in which: 1. the assembled section size is equal to section size in the header; 2. the section size is no more than 4 KB; and 3. the computed cyclic redundancy check (CRC) matches the CRC that was transmitted. The assembly itself may be performed on secure buffers. Responsive to the assembly being successfully completed, the assembled sections may be copied to non-secure buffers.

There may be scenarios in which some of the sections should be protected while others should not be protected. For example, the program map table (PMT) may never be protected. However, sections that carry interactive games may be protected. Therefore it may be necessary to have a finer granularity of what the secure demultiplexer is exposing to the HLOS. The secure demultiplexer in TrustZone 114 may be configured with the protection level of sections: 1. always send sections to HLOS; 2. never send sections to HLOS; and 3. list of table ids that can be sent to HLOS.

In case a software fallback is needed for any functionality in TSPP 110, the secure demultiplexer in TrustZone 114 may handle all security issues and/or secured content. Examples may include: 1. PES type recognition failure: all decrypted PES will be sent to secure pipes. TrustZone 114 may parse the PES header and determine the type. Accordingly it may copy the buffers to non-secure buffers; and 2. PES Assembly failure: all decrypted transport stream packets may be placed in secure buffers. Secure demultiplexer may assemble the PES in appropriate buffers according to PES type.

SMMU Mapping Tables (Table 8):

TABLE 8

| Sub-client | cSID | Memory Access | CB Mapping |
|---|---|---|---|
| TSPP BAM NDP | 0000000000 | HLOS access | CB0 |
| TSPP Pipe Context | 0xxxxxxxxxx | HLOS access | CB0 |
| TSPP Pipe Context | 1xxxxxxxxxx | Content protection | CB1 |

Figure 12:
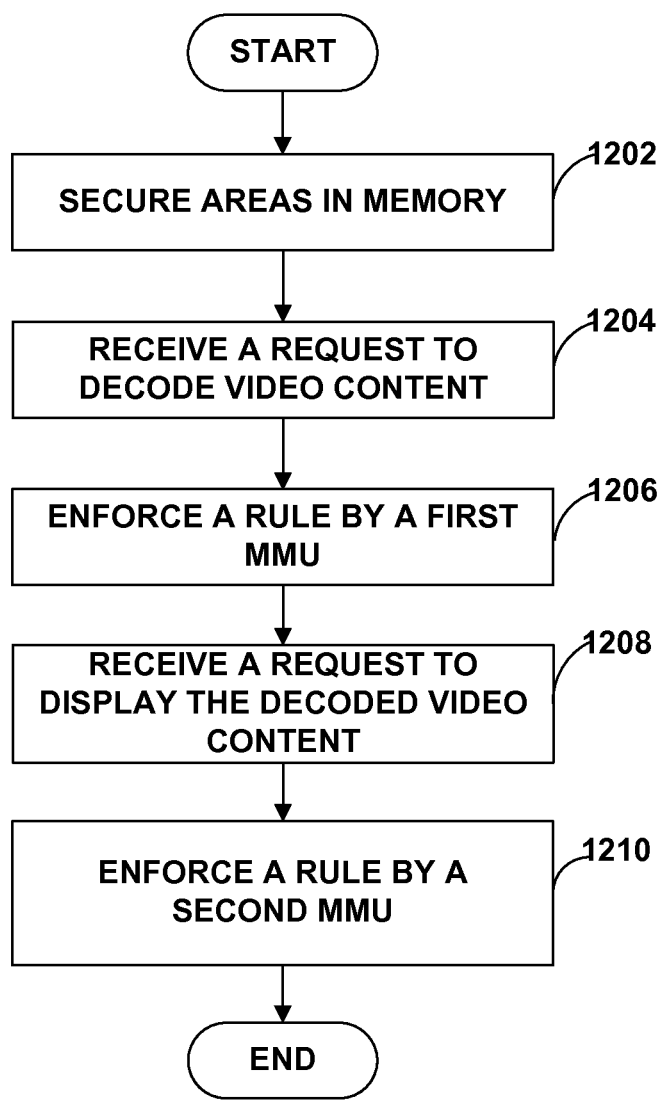
FIG. 12 is a flowchart illustrating a method for decoding and displaying copy protected video content according to embodiments of the present disclosure.

FIG. 12 is a flowchart illustrating a method for decoding and displaying copy protected video content according to embodiments of the present disclosure. As shown in FIG. 12, the method may include securing, by a hardware firewall of computing device 100, areas in memory 102 of computing device 100 to establish a secure memory area in memory 102 that is not accessible by unauthorized clients by enforcing read and write rules for the secure memory area (1202). The method may further include receiving a request to decode video content stored in the secure memory area (1204). The method may further include, if the video content to be decoded is stored in the secure memory area, enforcing a rule by a first memory management unit (MMU) associated with a hardware video decoder 106 of the computing device 100 that the video content is to be decoded into one or more output buffers in the secure memory area, including decoding, by the hardware video decoder 106, the video content into the one or more output buffers in the secure memory area (1206). The method may further include receiving a request to display the decoded video content stored in the secure memory area (1208). The method may further include, if the decoded video content is stored in the secure memory area, enforcing a rule by a second MMU associated with a hardware display processor 108 that a secure link be established between the hardware display processor 108 and an output device, including rendering, by the hardware display processor 108 in the computing device 100, the decoded video content at the output device via the secure link (1210).

In some examples, decoding the video content may further include receiving, by the first MMU from a client in the hardware video decoder 106, a request to access the video content stored in the secure memory area and a first client stream identifier (cSID) associated with the request; selecting, by the first MMU, a context bank out of a plurality of context banks based at least in part on the first cSID; and translating a virtual address included in the request to a physical address within the secure memory area using the selected context bank. In some examples, the method may further include comparing, by a hardware secure block associated with the hardware video decoder 106, a first SID associated with the request with stream identifier (SID) secure registers that represent a set of SIDs that the security block recognizes as originating from a secure context; and if the SID matches one of a plurality of SIDs in the SID secure registers, setting a most significant bit of the SID to '1', setting the SID as the cSID, and issuing a CPI bit='1'. In some examples, the method may further include indexing into a secure status determination table in the first MMU using the CPI bit to determine if the request originated from a secure context, and indexing into a stream matching table in the first MMU using the cSID and the CPI bit to determine the context bank for the request. In some examples, the method may further include returning, by the first MMU, a page fault if the request is not authorized to access the secure memory area.

In some examples, rendering the decoded video content may further include receiving, by the second MMU from a client in the hardware video processor 108, a request to access the decoded video content in the secure memory area and a client stream identifier (cSID) associated with the request; selecting the context bank out of the plurality of context banks based at least in part on the cSID; and translating a virtual address included in the request to a physical address within the secure memory area using the selected context bank.

The method may further include, if the request includes a read request, setting, by a display processor driver for the hardware display processor, a most significant bit of the cSID to '1' and issuing a CPI bit='1' if the read request is secure; and if the request includes a write request from one or more clients of the hardware display processor, setting, by the hardware display processor, the most significant bit of the cSID to '1' and issuing the CPI bit='1' if any of the one or more clients are content protected.

The method may further include indexing into a secure status determination table in the second MMU using the CPI bit to determine if the request originated from a secure context, and indexing into a stream matching table in the second MMU using the cSID and the CPI bit to determine the context bank for the request. The method may further include returning, by the second MMU, a page fault if the request is not authorized to access the secure memory area.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure . . . . By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

This disclosure also includes an attached appendix, which forms part of this disclosure and is expressly incorporated herein.

Various examples have been described. These and other examples are within the scope of the following claims.

The invention claimed is:

1. A method comprising:
securing, by a hardware firewall of a computing device, areas in a memory in the computing device to establish a secure memory area in the memory that is not accessible by unauthorized clients by enforcing read and write rules for the secure memory area;
receiving a request to decode video content stored in the secure memory area;
if the video content to be decoded is stored in the secure memory area, enforcing a rule by a first memory management unit (MMU) associated with a hardware video decoder of the computing device that the video content is to be decoded into one or more output buffers in the secure memory area, including decoding, by the hardware video decoder, the video content into the one or more output buffers in the secure memory area;
receiving a request to display the decoded video content stored in the secure memory area; and
if the decoded video content is stored in the secure memory area, enforcing a rule by a second MMU associated with a hardware display processor that a secure link be established between the hardware display processor and an output device, including rendering, by the hardware display processor in the computing device, the decoded video content at the output device via the secure link.

2. The method of claim 1, wherein decoding the video content further comprises:
receiving, by the first MMU from a client in the hardware video decoder, a request to access the video content stored in the secure memory area and a client stream identifier (cSID) associated with the request;
selecting, by the first MMU, a context bank out of a plurality of context banks based at least in part on the cSID; and
translating a virtual address included in the request to a physical address within the secure memory area using the selected context bank.

3. The method of claim 2, further comprising:
comparing, by a hardware secure block associated with the hardware video decoder, a stream identifier (SID) associated with the request with SID secure registers that represent a set of SIDs that the security block recognizes as originating from a secure context; and
if the SID matches one of a plurality of SIDs in the SID secure registers, setting a most significant bit of the SID to '1', setting the SID as the cSID, and issuing a CPI bit='1'.

4. The method of claim 3, further comprising:
indexing into a secure status determination table in the first MMU using the CPI bit to determine if the request originated from a secure context; and
indexing into a stream matching table in the first MMU using the cSID and the CPI bit to determine the context bank for the request.

5. The method of claim 4, further comprising:
returning, by the first MMU, a page fault if the request is not authorized to access the secure memory area.

6. The method of claim 1, wherein rendering the decoded video content further comprises:
receiving, by the second MMU from a client in the hardware display processor, a request to access the decoded video content and a client stream identifier (cSID) associated with the request;
selecting the context bank out of the plurality of context banks based at least in part on the cSID; and
translating a virtual address included in the request to a physical address within the secure memory area using the selected context bank.

7. The method of claim 6, further comprising:
if the request includes a read request, setting, by a display processor driver for the hardware display processor, a most significant bit of the cSID to '1' and issuing a CPI bit='1' if the read request is secure; and
if the request includes a write request from one or more clients of the hardware display processor, setting, by the hardware display processor, the most significant bit of the cSID to '1' and issuing the CPI bit='1' if any of the one or more clients are content protected.

8. The method of claim 7, further comprising:
indexing into a secure status determination table in the second MMU using the CPI bit to determine if the request originated from a secure context; and
indexing into a stream matching table in the second MMU using the cSID and the CPI bit to determine the context bank for the request.

9. The method of claim 8, further comprising:
returning, by the second MMU, a page fault if the request is not authorized to access the secure memory area.

10. A content protection apparatus comprising:
memory partitioned into a non-secure memory area and a secure memory area;
a hardware firewall configured to prevent unauthorized access to the secure memory area by enforcing read and write rules for the secure memory area;
a hardware video decoder configured to receive a request to decode video content stored in the secure memory area and to decode the video content into one or more output buffers in the secure memory area;
a first memory management unit (MMU) associated with the hardware video decoder, wherein the first MMU is configured to enforce a rule that the video content is to be decoded into the one more output buffers in the secure memory area;
a hardware display processor configured to receive a request to render the decoded video content and to render the decoded video content at an output device via a secure link; and
a second MMU associated with the hardware display processor, wherein the second MMU is configured to enforce a rule that a secure link be established between the hardware display processor and the output device.

11. The content protection apparatus of claim 10, wherein the first MMU is further configured to:

receive from a client in the hardware video decoder, a request to access the video content stored in the secure memory area and a client stream identifier (cSID) associated with the request;

select a context bank out of a plurality of context banks based at least in part on the cSID; and translate a virtual address included in the request to a physical address within the secure memory area using the selected context bank.

12. The content protection apparatus of claim 11, further comprising:

a hardware secure block associated with the hardware video decoder and configured to compare a stream identifier (SID) associated with the request with SID secure registers that represent a set of SIDs that the security block recognizes as originating from a secure context, and to, if the SID matches one of a plurality of SIDs in the SID secure registers, set a most significant bit of the SID to '1', setting the SID as the cSID, and issuing a CPI bit='1'.

13. The content protection apparatus of claim 12, wherein the first MMU is further configured to:

index into a secure status determination table in the first MMU using the CPI bit to determine if the request originated from a secure context; and index into a stream matching table in the first MMU using the cSID and the CPI bit to determine the context bank for the request.

14. The content protection apparatus of claim 13, wherein the first MMU is further configured to return a page fault if the request is not authorized to access the secure memory area.

15. The content protection apparatus of claim 10, wherein the second MMU is further configured to:

receive from a client in the hardware display processor, a request to access the decoded video content and a client stream identifier (cSID) associated with the request;

select the context bank out of the plurality of context banks based at least in part on the cSID; and select a virtual address included in the request to a physical address within the secure memory area using the selected context bank.

16. The content protection apparatus of claim 15, further comprising:

a display processor driver for the hardware display processor configured to, if the request includes a read request, set a most significant bit of the cSID to '1' and issuing a CPI bit='1' if the read request is secure, and to, if the request includes a write request from one or more clients of the hardware display processor, set the most significant bit of the cSID to '1' and issuing the CPI bit='1' if any of the one or more clients are content protected.

17. The content protection apparatus of claim 16, wherein the second MMU is further configured to:

index into a secure status determination table in the second MMU using the CPI bit to determine if the request originated from a secure context; and index into a stream matching table in the second MMU using the cSID and the CPI bit to determine the context bank for the request.

18. The content protection apparatus of claim 17, wherein the second MMU is further configured to return a page fault if the request is not authorized to access the secure memory area.

19. An apparatus comprising:

means for securing areas in a memory in a computing device to establish a secure memory area in the memory that is not accessible by unauthorized clients by enforcing read and write rules for the secure memory area;

means for receiving a request to decode video content stored in the secure memory area;

if the video content to be decoded is stored in the secure memory area, means for enforcing a rule that the video content is to be decoded into one or more output buffers in the secure memory area, including means for decoding the video content into the one or more output buffers in the secure memory area;

means for receiving a request to display the decoded video content stored in the secure memory area; and if the decoded video content is stored in the secure memory area, means for enforcing a rule that a secure link be established to an output device, including means for rendering the decoded video content at the output device via the secure link.

20. The apparatus of claim 19, wherein the means for enforcing the rule that the video content is to be decoded into one or more output buffers in the secure memory area further comprises:

means for receiving a request to access the video content stored in the secure memory area and a client stream identifier (cSID) associated with the request;

means for selecting a context bank out of a plurality of context banks based at least in part on the cSID; and means for translating a virtual address included in the request to a physical address within the secure memory area using the selected context bank.

21. The apparatus of claim 20, further comprising:

means for comparing a first stream identifier (SID) associated with the request with SID secure registers that represent a set of SIDs that the security block recognizes as originating from a secure context; and if the SID matches one of a plurality of SIDs in the SID secure registers, means for setting a most significant bit of the SID to '1', setting the SID as the cSID, and issuing a CPI bit='1'.

22. The apparatus of claim 21, further comprising:

means for indexing into a secure status determination table using the CPI bit to determine if the request originated from a secure context; and means for indexing into a stream matching table using the cSID and the CPI bit to determine the context bank for the request.

23. The apparatus of claim 22, further comprising:

means for returning a page fault if the request is not authorized to access the secure memory area.

24. The apparatus of claim 19, wherein means for enforcing the rule that the video content is to be decoded into one or more output buffers in the secure memory area further comprises:

means for receiving a request to access the decoded video content and a client stream identifier (cSID) associated with the request;

means for selecting the context bank out of the plurality of context banks based at least in part on the cSID; and means for translating a virtual address included in the request to a physical address within the secure memory area using the selected context bank.

25. The apparatus of claim 24, further comprising:

if the request includes a read request, means for setting a most significant bit of the cSID to '1' and issuing a CPI bit='1' if the read request is secure; and if the request includes a write request from one or more clients, means for setting the most significant bit of the cSID to '1' and issuing the CPI bit='1' if any of the one or more clients are content protected.

26. The apparatus of claim 25, further comprising:
means for indexing into a secure status determination table using the CPI bit to determine if the request originated from a secure context; and
means for indexing into a stream matching table using the cSID and the CPI bit to determine the context bank for the request.

27. The apparatus of claim 25, further comprising:
means for returning a page fault if the request is not authorized to access the secure memory area.

* * * * *